US012240087B2

(12) United States Patent
Mochizuki

(10) Patent No.: US 12,240,087 B2
(45) Date of Patent: Mar. 4, 2025

(54) HANDHELD TOOL

(71) Applicant: Max Co., Ltd., Tokyo (JP)

(72) Inventor: Kazuya Mochizuki, Tokyo (JP)

(73) Assignee: Max Co., Ltd., Tokyo (JP)

( * ) Notice: Subject to any disclaimer, the term of this patent is extended or adjusted under 35 U.S.C. 154(b) by 0 days.

(21) Appl. No.: 18/491,254

(22) Filed: Oct. 20, 2023

(65) Prior Publication Data

US 2024/0131668 A1 Apr. 25, 2024
US 2024/0227143 A9 Jul. 11, 2024

(30) Foreign Application Priority Data

Oct. 21, 2022 (JP) ................................ 2022-169182

(51) Int. Cl.
*B25C 1/00* (2006.01)

(52) U.S. Cl.
CPC .................................. *B25C 1/001* (2013.01)

(58) Field of Classification Search
None
See application file for complete search history.

(56) References Cited

U.S. PATENT DOCUMENTS 3,330,462 A * 7/1967 Colechia ................ B25C 1/003 227/5
3,543,987 A * 12/1970 Obergfell .............. B25C 5/1627 227/136
4,294,391 A * 10/1981 Obergfell ................ B25C 1/003 91/399
4,600,135 A 7/1986 Mukoyama
6,126,057 A * 10/2000 Li ........................... B25C 1/003 227/136
2005/0263559 A1* 12/2005 Hagan ..................... B25C 1/003 227/135
2005/0263560 A1* 12/2005 Niblett .................... B25C 1/003 227/135
2007/0090146 A1* 4/2007 Li ........................... B25C 1/003 227/137
2007/0170223 A1* 7/2007 Lin ......................... B25C 1/003 227/120

(Continued)

FOREIGN PATENT DOCUMENTS

EP 1057593 A2 12/2000
JP 6070946 B2 2/2017

OTHER PUBLICATIONS

Feb. 19, 2024—(EP) Extended Search Report—App 23204442.0.

*Primary Examiner* — Tanzim Imam
(74) *Attorney, Agent, or Firm* — Banner & Witcoff, Ltd.

(57) ABSTRACT

A handheld tool includes a nose portion having an injection passage for a fastener, a magazine accommodating the fastener and located in a direction intersecting with the injection passage, a magazine cap portion opening and closing the magazine by a tip portion rotating in a direction separating from and approaching the magazine with a base end portion as a fulcrum, and a door portion rotatably coupled to the tip portion via a coupling shaft. The nose portion includes an engaging portion engageable with the door portion. The door portion is configured to, in a state where the magazine cap portion is opened, bent toward the magazine with the coupling shaft as a fulcrum, and in a state where the magazine cap portion is closed, extend linearly and engage with the engaging portion.

7 Claims, 22 Drawing Sheets

(56) References Cited

U.S. PATENT DOCUMENTS

| | | | | |
|---|---|---|---|---|
| 2008/0035700 | A1* | 2/2008 | Huang | B25C 1/003 227/120 |
| 2008/0128468 | A1* | 6/2008 | Lee | B25C 5/1658 227/120 |
| 2008/0251559 | A1* | 10/2008 | Uejima | B25C 1/08 227/3 |
| 2009/0114697 | A1* | 5/2009 | Gross | B25C 1/001 227/120 |
| 2010/0258608 | A1 | 10/2010 | Porth et al. | |

* cited by examiner

HANDHELD TOOL

CROSS-REFERENCE TO RELATED APPLICATIONS

The present application claims priority from Japanese Patent Application No. 2022-169182 filed on Oct. 21, 2022, the entire content of which is incorporated herein by reference.

TECHNICAL FIELD

The present disclosure relates to a handheld tool that includes a magazine accommodating a fastener and is configured to inject the fastener accommodated in the magazine.

BACKGROUND ART

A handheld tool that injects a fastener such as a screw or a nail includes a magazine that accommodates the fastener. The magazine accommodates a fastener coupling body in which a plurality of fasteners are coupled by a coupling band. In such a tool, a nose portion from which the fastener is injected, a magazine cap portion provided in the magazine in order to allow the fastener coupling body to be loaded into the magazine, and a door portion provided in the nose portion are configured to be opened and closed, respectively (for example, see JP6070946B).

SUMMARY

In the related art, it is necessary to independently open and close the magazine cap portion provided in the magazine and the door portion provided in the nose portion. Thus, it takes time and effort to perform an operation of opening and closing the magazine by the magazine cap portion and the door portion.

Illustrative aspects of the present disclosure provide a handheld tool that facilitates an operation of opening and closing a magazine by a magazine cap portion and a door portion.

One illustrative aspect of the present disclosure provides a handheld tool including: a nose portion having an injection passage for a fastener; a magazine configured to accommodate the fastener and located in an intersecting direction intersecting with the injection passage; a magazine cap portion including a tip portion and a base end portion, the base end portion being opposite to the tip portion in the intersecting direction, the magazine cap portion being configured to open and close the magazine by the tip portion separating from and approaching the magazine, the tip portion being rotatable in a direction separating from and approaching the magazine with the base end portion as a fulcrum; and a door portion rotatably coupled to the tip portion of the magazine cap portion via a coupling shaft. The nose portion includes an engaging portion engageable with the door portion. The door portion is configured to: in a state where the magazine cap portion is opened, bent toward the magazine with the coupling shaft as a fulcrum; and in a state where the magazine cap portion is closed, extend linearly and engage with the engaging portion.

In the present disclosure, in a form in which the magazine cap portion and the door portion are bent by rotation with the coupling shaft as a fulcrum, a distance between the base end portion of the magazine cap portion and a tip portion of the door portion is shorter as compared with that in a form in which the magazine cap portion and the door portion extend linearly. Accordingly, in the form in which the magazine cap portion and the door portion are bent, the door portion does not engage with the engaging portion by an operation in which the magazine cap portion and the door portion open and close the magazine by rotation of the magazine cap portion with the base end portion as a fulcrum. On the other hand, in a state where the magazine is closed by the magazine cap portion and the door portion, the magazine cap portion and the door portion extend linearly, and the door portion engages with the engaging portion. In this manner, by changing the magazine cap portion and the door portion from the form of being bent to the form of extending linearly, the magazine cap portion and the door portion are closed in a closed state.

In the present disclosure, since the magazine cap portion and the door portion are rotatably coupled to each other via the coupling shaft, the engaging portion does not hinder opening and closing of the magazine by the magazine cap portion and the door portion in the form in which the magazine cap portion and the door portion are bent. On the other hand, in the state where the magazine is closed by the magazine cap portion and the door portion, the magazine cap portion and the door portion extend linearly, and the door portion engages with the engaging portion. Accordingly, since the magazine cap portion and the door portion can be integrally opened and closed, the operation of opening and closing the magazine by the magazine cap portion and the door portion is easy.

DESCRIPTION OF EMBODIMENTS

Hereinafter, illustrative embodiments of a screw driving machine as an example of a handheld tool of the present disclosure will be described with reference to the drawings.

{Configuration Example of Screw Driving Machine}

Figure 1A:
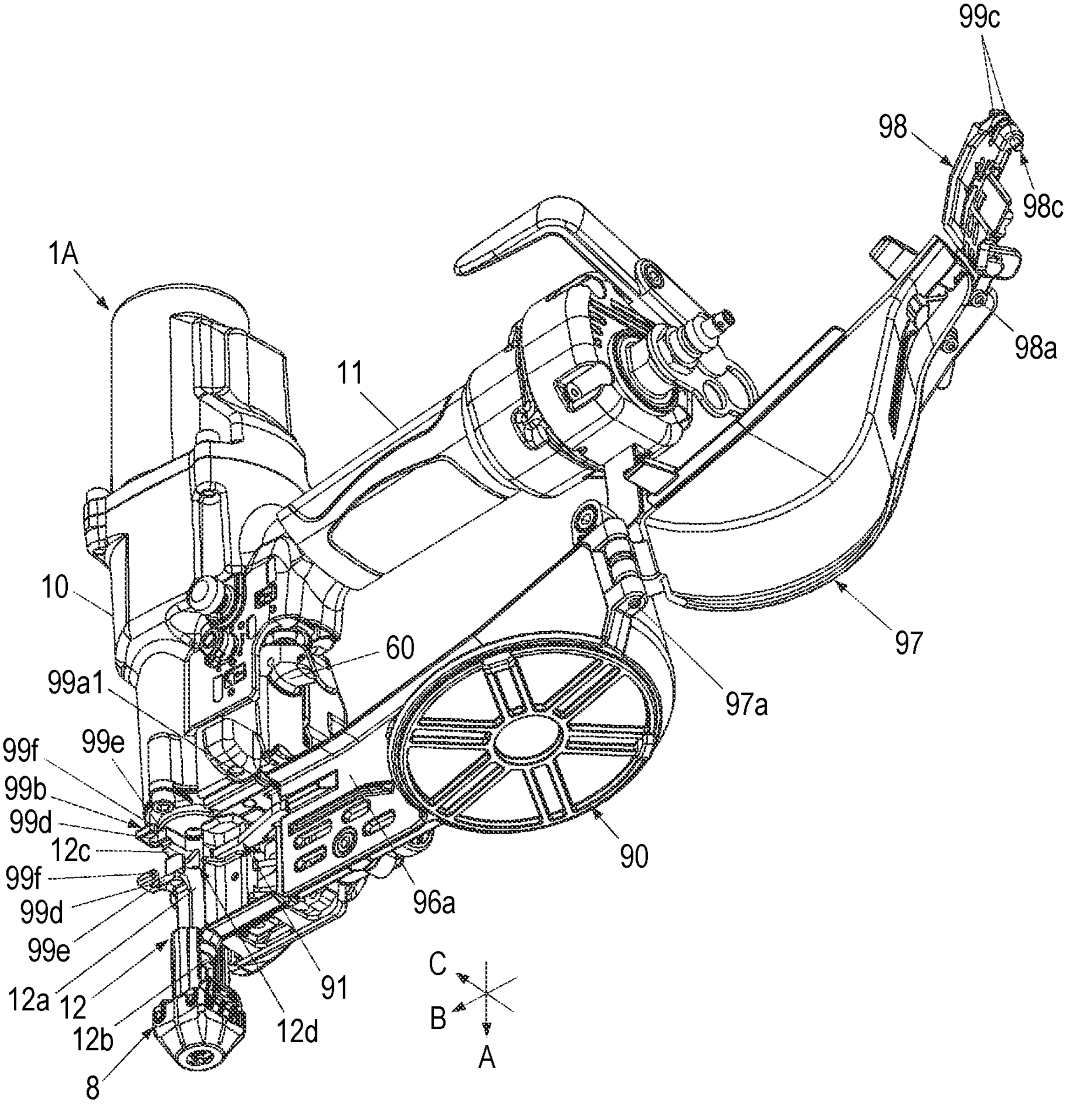
FIG. 1A is a perspective view illustrating an example of a screw driving machine according to the present illustrative embodiment.
Figure 1B:
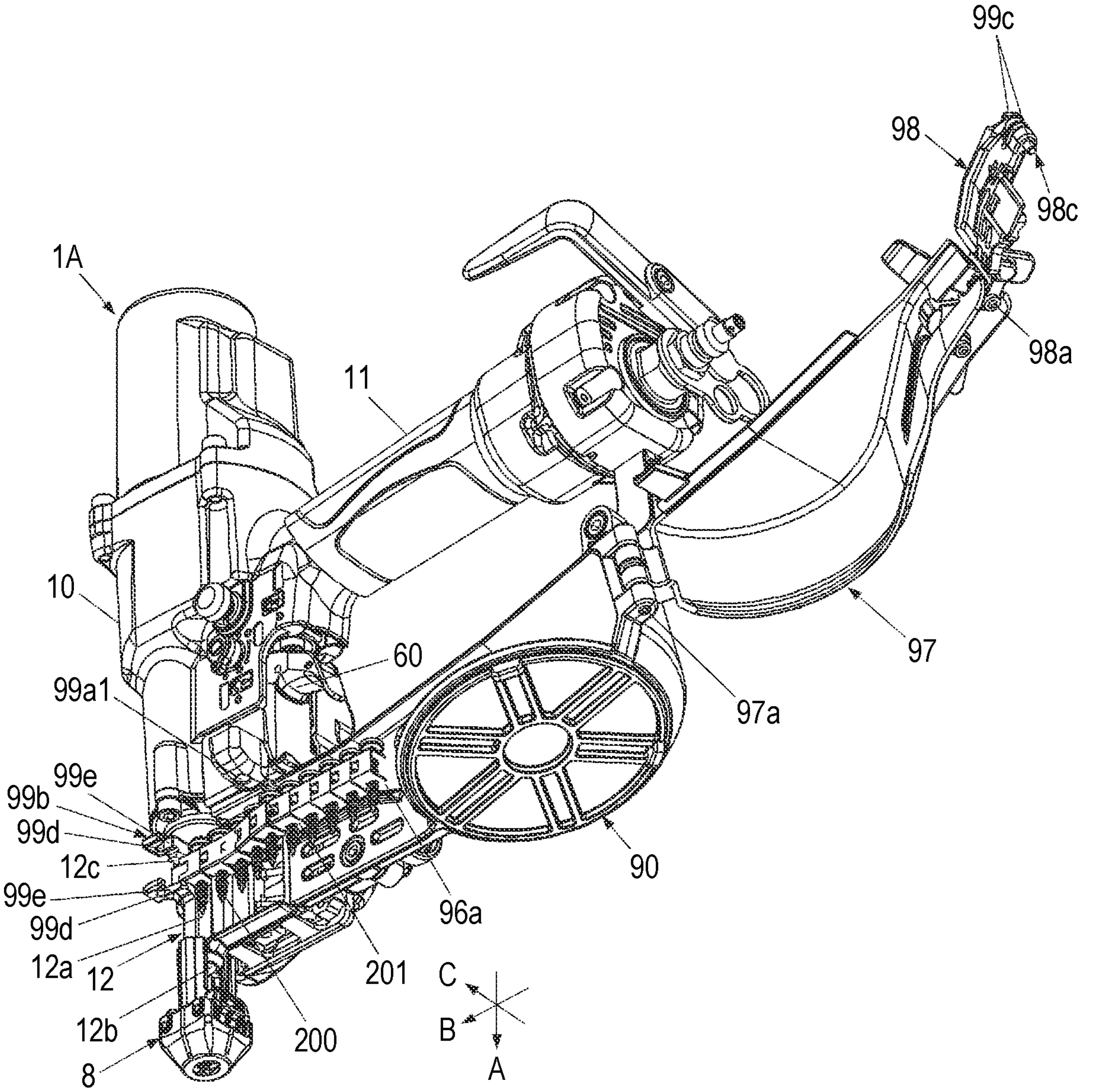
FIG. 1B is a perspective view illustrating the example of the screw driving machine according to the present illustrative embodiment.
Figure 2A:
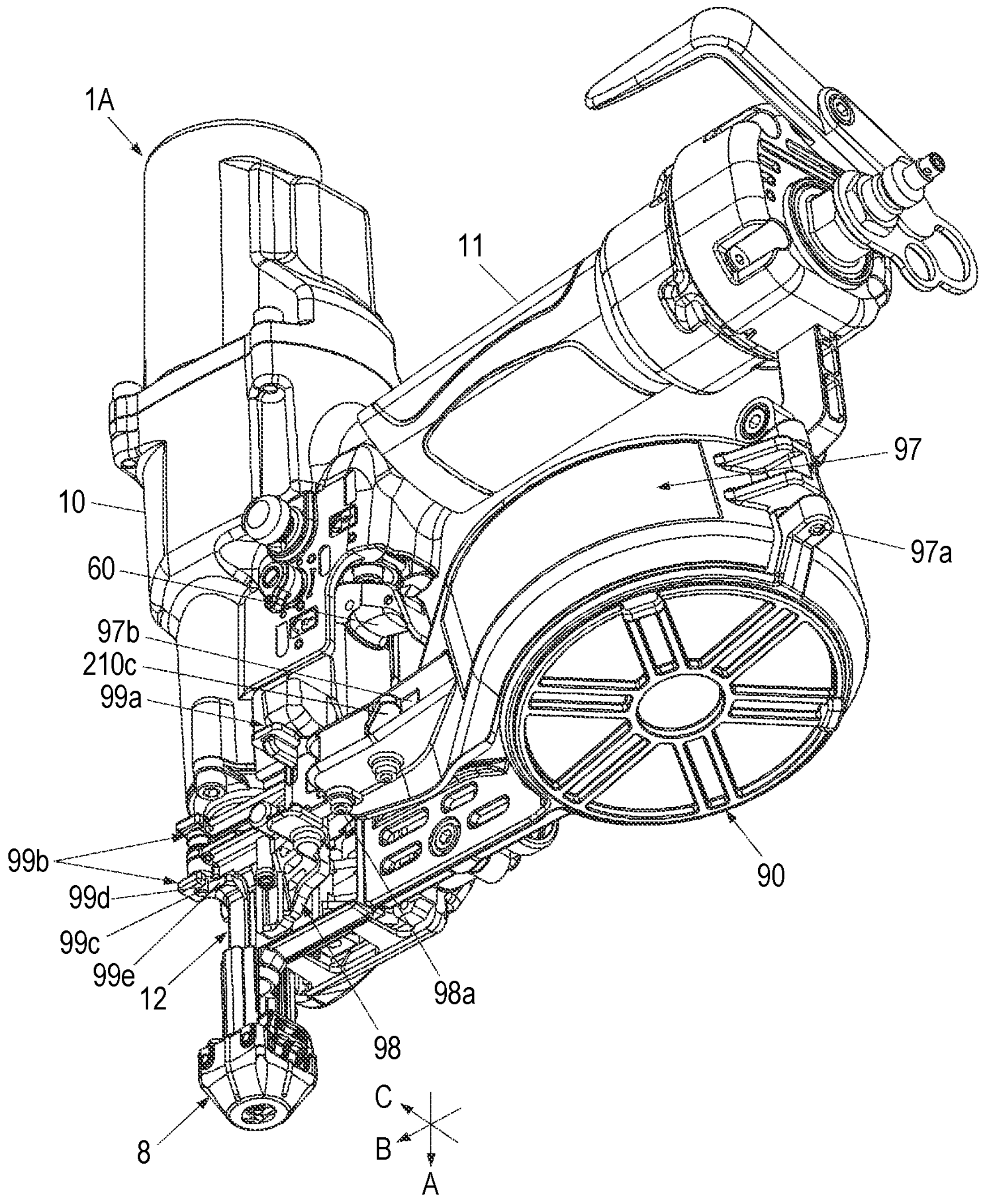
FIG. 2A is a perspective view illustrating an example of the screw driving machine according to the present illustrative embodiment.
Figure 2B:
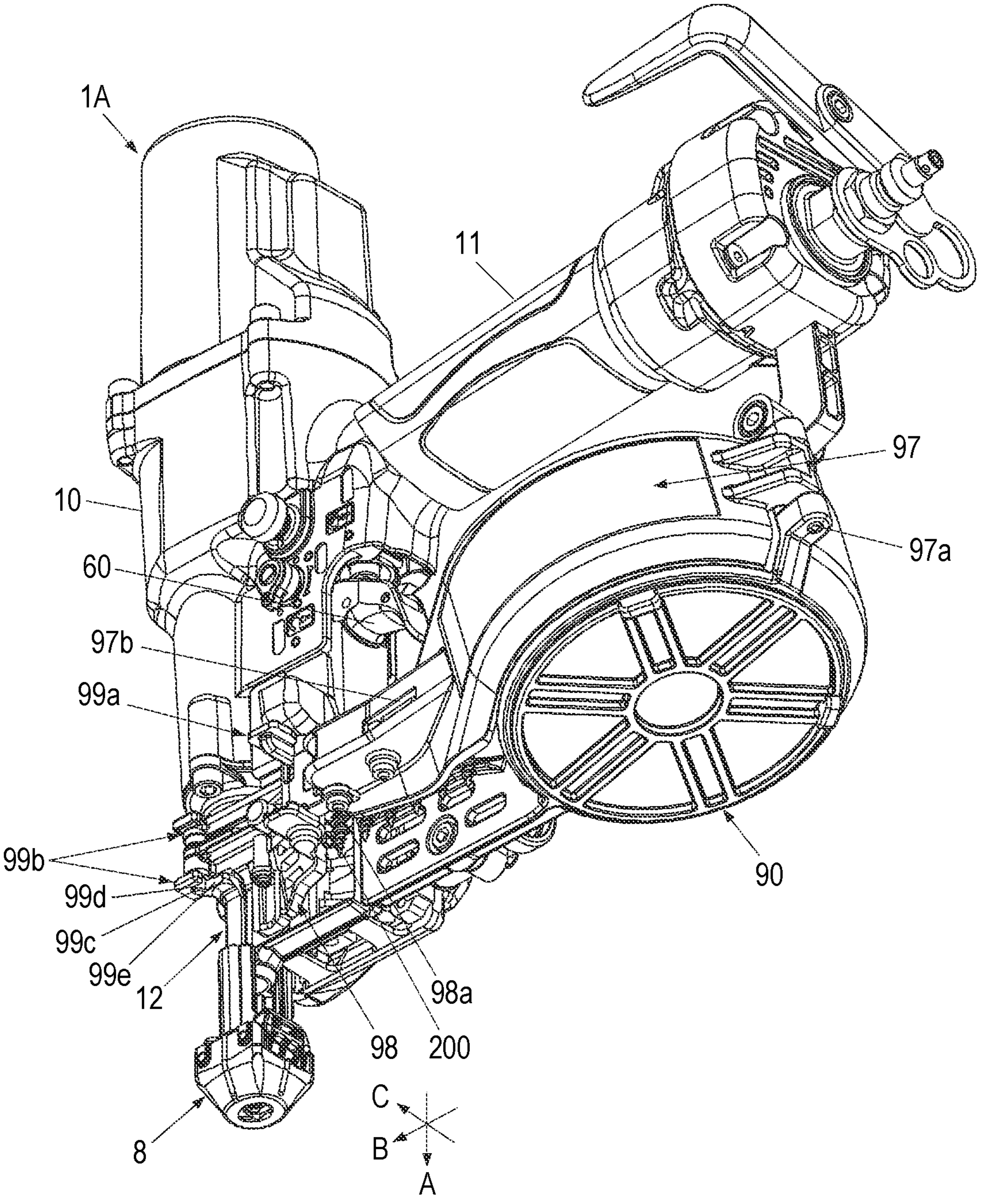
FIG. 2B is a perspective view illustrating the example of the screw driving machine according to the present illustrative embodiment.

FIGS. 1A, 1B, 2A, and 2B are perspective views illustrating examples of a screw driving machine according to the present illustrative embodiment. FIG. 1A illustrates a state where a magazine is in an open state and screws are not loaded, and FIG. 1B illustrates a state where the magazine is in the open state and the screws are loaded. In addition, FIG. 2A illustrates a state where the magazine is in a closed state and the screws are not loaded, and FIG. 2B illustrates a state where the magazine is in the closed state and the screws are loaded.

Figure 3A:
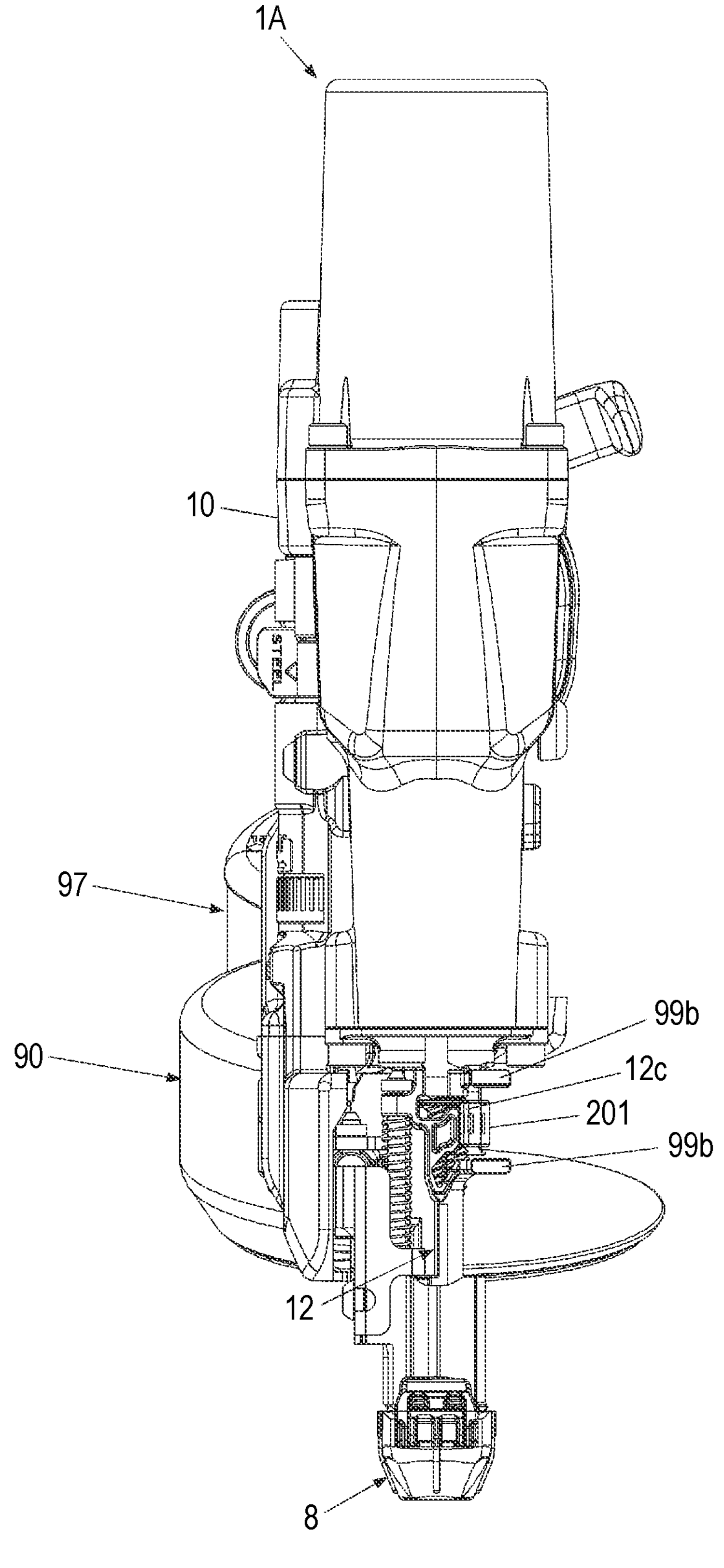
FIG. 3A is a front view illustrating an example of the screw driving machine according to the present illustrative embodiment.
Figure 3B:
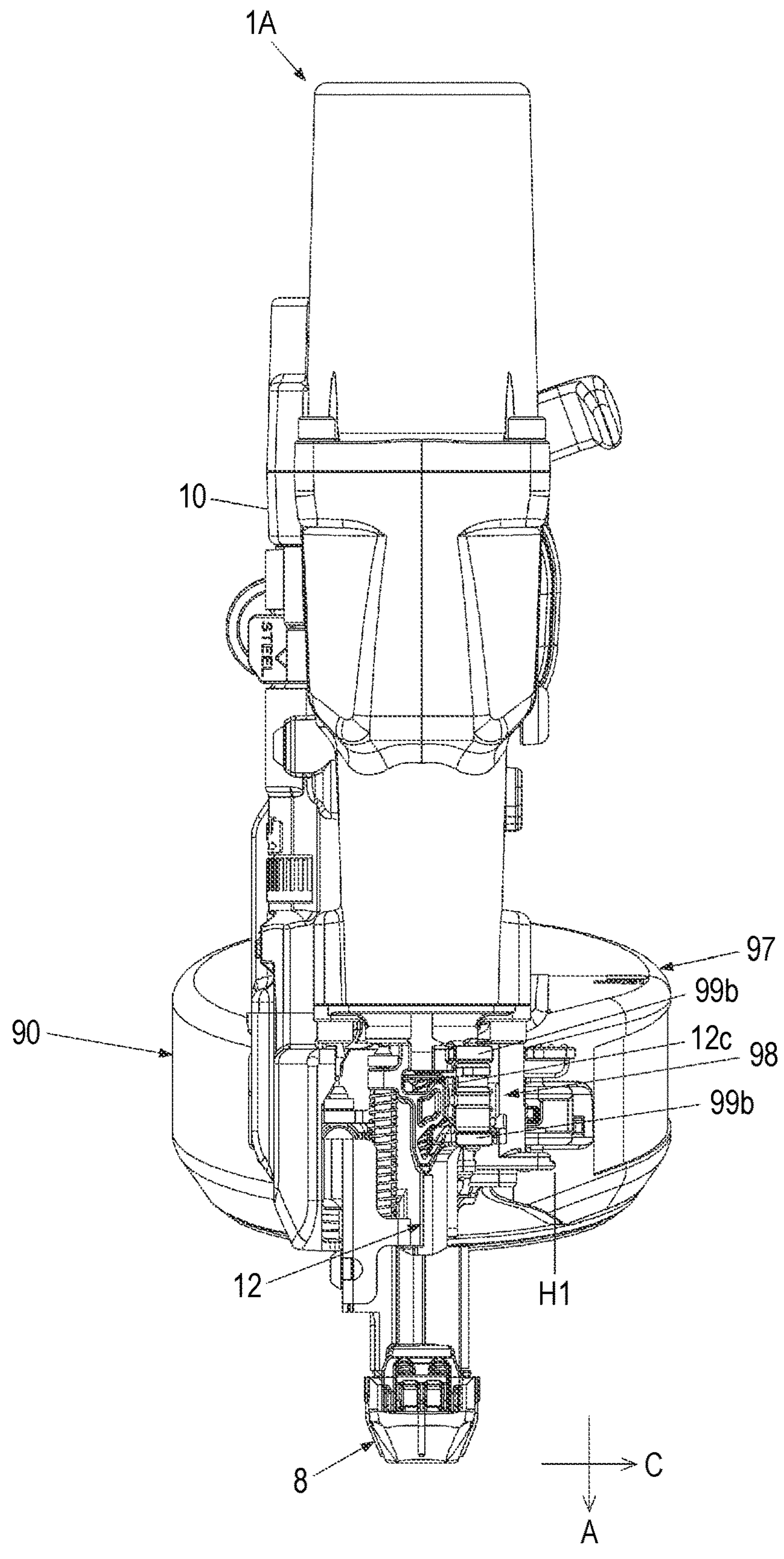
FIG. 3B is a front view illustrating the example of the screw driving machine according to the present illustrative embodiment.
Figure 3C:
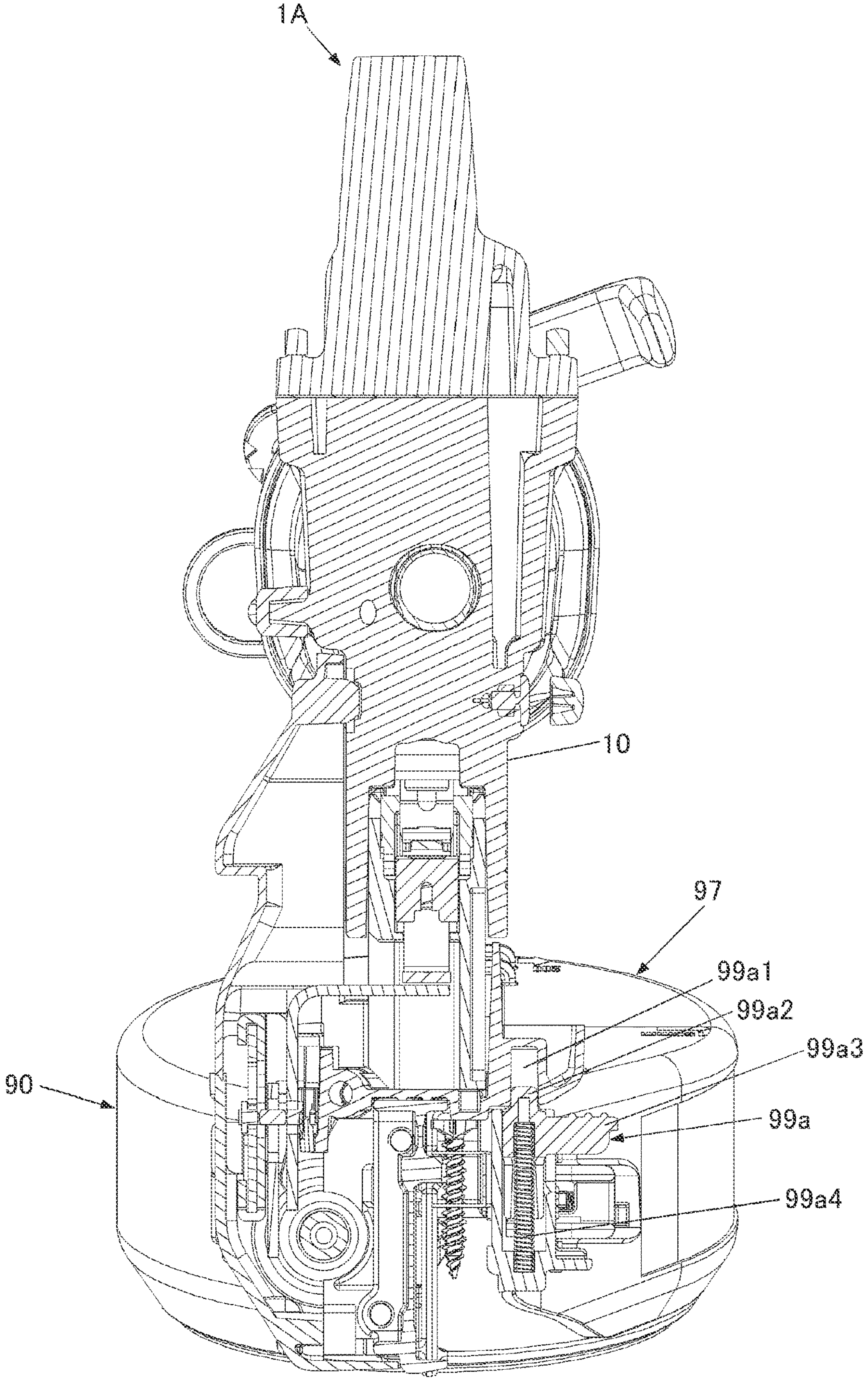
FIG. 3C is a front sectional view illustrating the example of the screw driving machine according to the present illustrative embodiment.
Figure 4A:
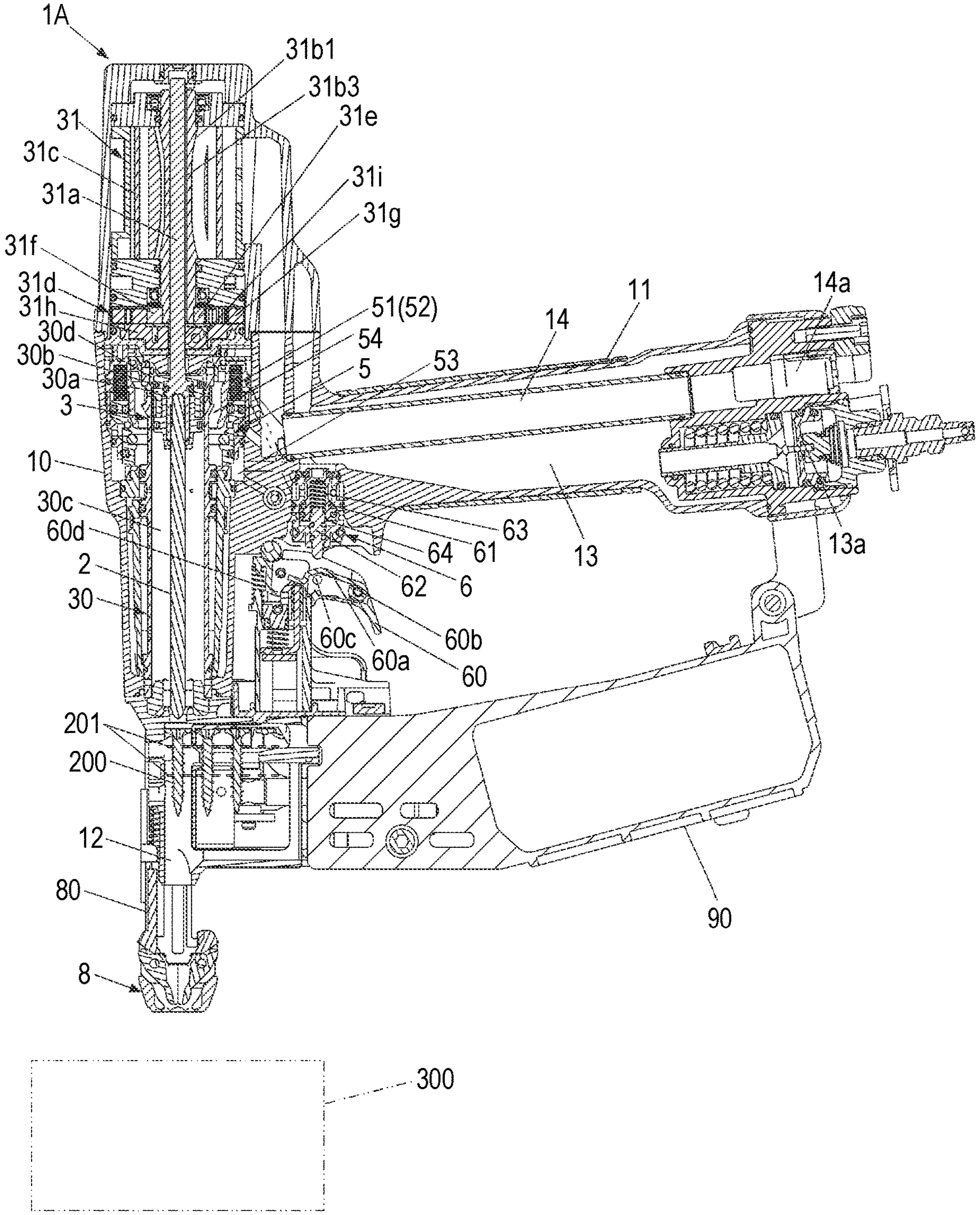
FIG. 4A is a side sectional view illustrating an example of the screw driving machine according to the present illustrative embodiment.
Figure 4B:
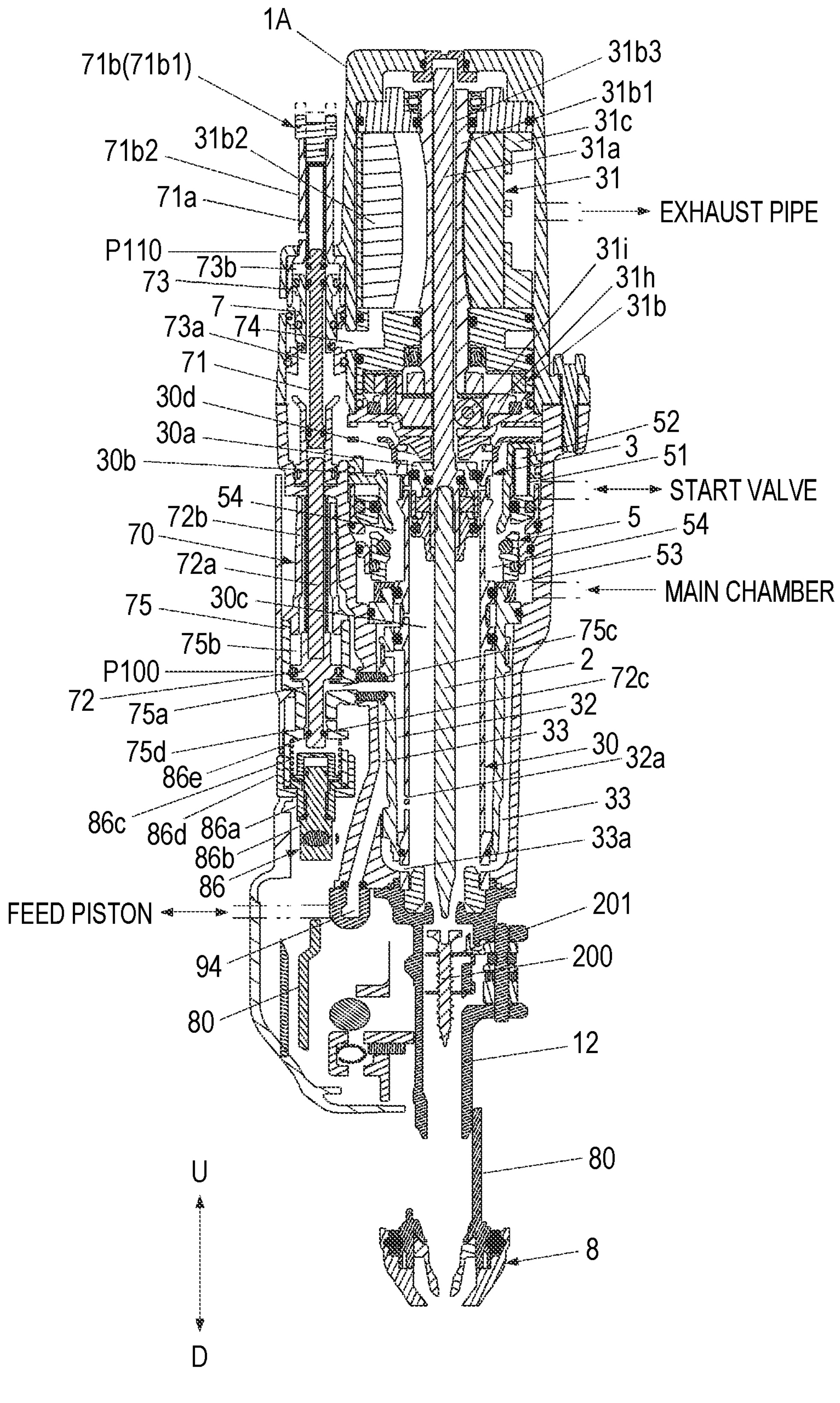
FIG. 4B is a front sectional view illustrating the example of the screw driving machine according to the present illustrative embodiment.
Figure 4C:
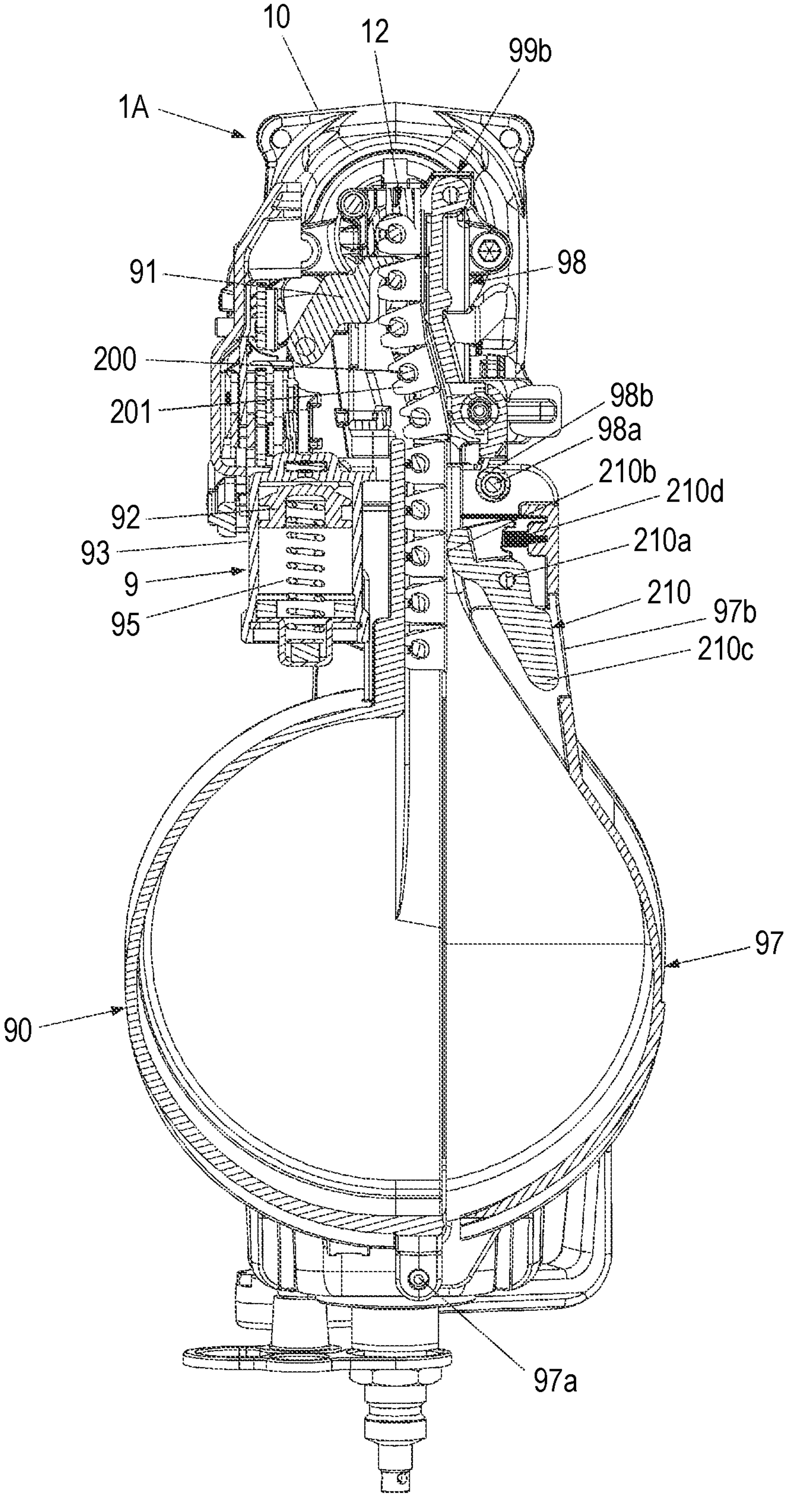
FIG. 4C is a bottom sectional view illustrating the example of the screw driving machine according to the present illustrative embodiment.

FIGS. 3A and 3B are front views illustrating examples of the screw driving machine according to the present illustrative embodiment. FIG. 3A illustrates a state where the magazine is in the open state and the screws are loaded, and FIG. 3B illustrates a state where the magazine is in the closed state and the screws are loaded. Further, FIG. 3C is a front sectional view illustrating an example of the screw driving machine according to the present illustrative embodiment. In addition, FIG. 4A is a side sectional view illustrating an example of the screw driving machine according to the present illustrative embodiment, FIG. 4B is a front sectional view illustrating the example of the screw driving machine according to the present illustrative embodiment, and FIG. 4C is a bottom sectional view illustrating the example of the screw driving machine according to the present illustrative embodiment. In addition, FIG. 5 is a perspective view illustrating an example of a screw coupling body.

Figure 5:
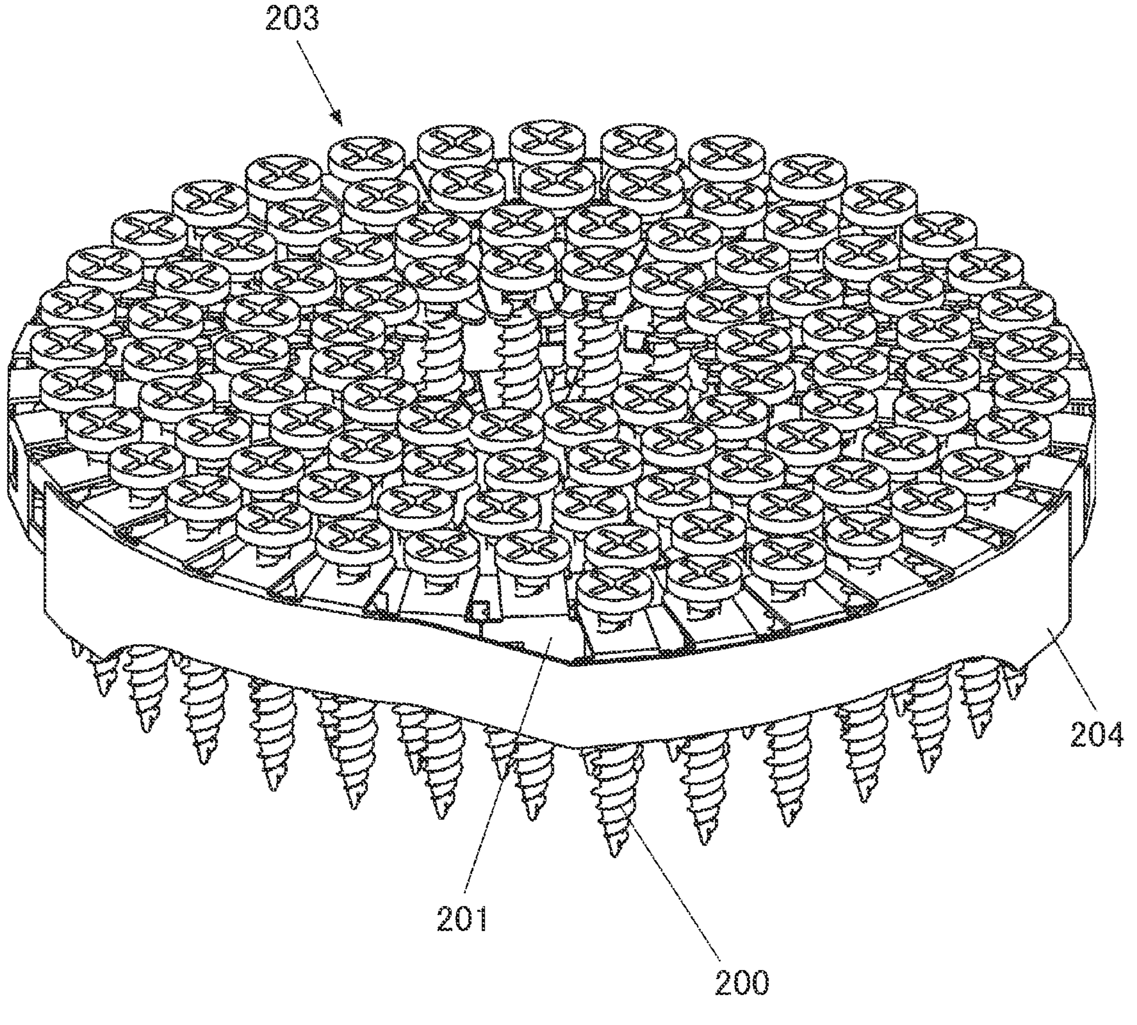
FIG. 5 is a perspective view illustrating an example of a screw coupling body.

As illustrated in FIG. 5, in a screw driving machine 1A, a plurality of screws 200 which are fasteners are coupled by a coupling band 201, and a screw coupling body 203 in a form of being wound in a spiral shape, for example, is used as a fastener coupling body. An unused screw coupling body 203 is fixed by a tape 204 such that the spiral shape is not deformed. The coupling band 201 may be formed by a plastic sheet having a predetermined shape that supports a shaft portion of the screw 200 or a nail, or may be formed by bonding a plurality of fasteners with a tape or by welding the plurality of fasteners with a metal wire.

A screw driving machine 1A includes a fastening portion 3 that is driven by compressed air, causes a driver bit 2 to move in an axial direction, drives the screw 200 into a driven member 300, and then causes the driver bit 2 to rotate to tighten the screw 200. The fastening portion 3 includes a driving cylinder 30 that causes the driver bit 2 to move in the axial direction, and an air motor 31 that causes the driver bit 2 to rotate around an axis.

In addition, the screw driving machine 1A includes a main valve 5, a start valve 6, and a trigger 60. The main valve 5 is configured to switch whether to supply the compressed air to the driving cylinder 30. The start valve 6 is configured to cause the main valve 5 to operate. The trigger 60 is configured to cause the start valve 6 to operate.

Further, the screw driving machine 1A includes an on-off valve 7 and a controller 70. The on-off valve 7 is configured to switch whether an operation of the air motor 31 is to be performed. The controller 70 is configured to cause the on-off valve 7 to operate. In addition, the screw driving machine 1A includes a contact arm 8. The contact arm 8 is configured to come into contact with the driven member 300, be movable in the axial direction along a driving direction of the screw 200, enable the start valve 6 to operate in cooperation with an operation of the trigger 60, and cause the controller 70 to operate.

In addition, the screw driving machine 1A includes a screw feeding portion 9 and a magazine 90. The screw feeding portion 9 is configured to feed the screw coupling body 203 to a nose portion 12 to be described later. The magazine 90 is configured to accommodate the screw coupling body 203 to be fed by the screw feeding portion 9.

The screw driving machine 1A includes a main body portion 10 and a handle portion 11. The handle portion 11 extends in a direction intersecting the main body portion 10. In the screw driving machine 1A, the nose portion 12 is provided on one side along an extending direction of the main body portion 10 extending along the axial direction of the driver bit 2. The driver bit 2 is configured to pass through the nose portion 12 when the screw 200 coupled by the coupling band 201 is supplied by the screw feeding portion 9. In the screw driving machine 1A, the one side along the extending direction of the main body portion 10 on which the nose portion 12 is provided is referred to as a lower side, and the other side along the extending direction of the main body portion 10 is referred to as an upper side. In the screw driving machine 1A, the magazine 90 is provided on the lower side of the handle portion 11 in a case where one side of the handle portion 11 along an extending direction of the main body portion 10 is directed toward the lower side.

The nose portion 12 has an injection passage 12*a* and an injection port 12*b*. The screw 200 coupled by a coupling band 201 is supplied to the injection passage 12*a*. The injection port 12*b* is formed in one end portion along an extending direction of the injection passage 12*a* indicated by an arrow A. The screw 200 separated from the coupling band 201 is injected from the injection port 12*b*.

The screw driving machine 1A includes a main chamber 13. The main chamber 13 is supplied with compressed air from an external air compressor (not illustrated). The main chamber 13 is provided in the handle portion 11 and on an outer periphery of the driving cylinder 30 connected to an inside of the handle portion 11 in the main body portion 10. Compressed air decompressed by a pressure reducing valve 13*a* is supplied to the main chamber 13. In addition, the screw driving machine 1A includes an exhaust pipe 14. The compressed air supplied to the driving cylinder 30, the air motor 31, and the like, is exhausted from the exhaust pipe 14. The exhaust pipe 14 is provided in the handle portion 11. The compressed air is exhausted from the exhaust pipe 14 via an exhaust filter 14*a*.

The driving cylinder 30 is provided inside the main body portion 10 in a form of extending vertically. The driving cylinder 30 is provided with a driving piston 30*a* in a cylindrical internal space so as to be slidable. The driving piston 30*a* includes a seal portion 30*b* on an outer periphery thereof. The driving piston 30*a* is accommodated in the driving cylinder 30. The driving piston 30*a* partitions an interior of the driving cylinder 30 into a first chamber 30*c* and a second chamber 30*d*. A motor shaft 31*a* is attached to the driving piston 30*a*. The motor shaft 31*a* is driven by the air motor 31. In a state where the driving piston 30*a* is at the top dead center position, the driver bit 2 is connected to a first chamber 30*c* side. That is, the driver bit 2 is detachably attached to the driving piston 30*a* via the motor shaft 31*a* in a form of protruding from the driving piston 30*a* toward the lower side. In addition, the motor shaft 31*a* is provided on a side opposite to the driver bit 2 with respect to the driving piston 30*a*. The motor shaft 31*a* is attached to the driving piston 30*a* in a form of protruding from the driving piston 30*a* toward the upper side.

In the driving cylinder 30, the compressed air is supplied from the main chamber 13 to the second chamber 30*d*. The driving piston 30*a* is pressed by an air pressure of the compressed air supplied to the second chamber 30*d* of the driving cylinder 30 and moves in a downward direction indicated by an arrow D to cause the driver bit 2 to move in the downward direction along the axial direction. The driver bit 2 and the motor shaft 31*a* move integrally with the driving piston 30*a*. The driver bit 2 that moves in the downward direction is guided by the nose portion 12, thereby driving the screw 200 supplied from the magazine 90 to the nose portion 12 into the driven member 300. In addition, when the driver bit 2 is driven by the air motor 31 and the motor shaft 31*a* rotates, the driver bit 2 rotates integrally with the motor shaft 31*a* to fasten the screw 200 driven into the driven member 300.

The screw driving machine 1A includes a timer chamber 32 and a blowback chamber 33. The timer chamber 32 is supplied with the compressed air for causing the controller 70 to operate. The blowback chamber 33 causes the driving piston 30*a* moved to the bottom dead center position to return to the top dead center position and is supplied with the compressed air for causing the screw feeding portion 9 to operate.

The timer chamber 32 and the blowback chamber 33 are provided on an outer peripheral side of the driving cylinder 30 inside the main body portion 10. The timer chamber 32 is in communication with a space in the driving cylinder 30 via a side hole flow path 32*a* of the driving cylinder 30. In addition, the blowback chamber 33 is in communication with the space in the driving cylinder 30 via a side hole flow path 33*a* of the driving cylinder 30. In the timer chamber 32 and the blowback chamber 33, the compressed air is supplied by an operation of the driving piston 30*a* moving from the top dead center position to the bottom dead center position, and pressure increases according to a position of the driving piston 30*a*. The air motor 31 includes a rotor 31*b*1, a blade 31*b*2, and a motor housing 31*c*. The rotor 31*b*1 is configured to rotate the motor shaft 31*a*. The blade 31*b*2 is configured to receive a flow of air for causing the rotor 31*b*1 to rotate. The motor housing 31*c* rotatably supports the rotor 31*b*1 and is configured to generate the flow of air for causing the rotor 31*b*1 to rotate. In the air motor 31, rotation of the rotor 31*b*1 is transmitted to the motor shaft 31*a* via a speed reducer 31*d*. The speed reducer 31*d* is provided between the driving cylinder 30 and the air motor 31. The speed reducer 31*d* is configured by a planetary gear mechanism. The speed reducer 31*d* includes a sun gear 31*e* connected to the rotor 31*b*1, a plurality of planetary gears 31*f* meshing with the sun gear 31*e*, an outer gear 31*g* meshing with the planetary gears 31*f*, and a carrier 31*h* rotatably supporting the planetary gears 31*f*. In the speed reducer 31*d*, the sun gear 31*e*, the planetary gears 31*f*, and the outer gear 31*g* are provided on the same surface in the axial direction of the driver bit 2. In addition, in the speed reducer 31*d*, the carrier 31*h* is provided on the lower side of the sun gear 31*e*, the planetary gears 31*f*, and the outer gear 31*g*.

The rotor 31*b*1 has a hollow structure in which a hole portion 31*b*3 is provided so as to penetrate from an upper end to a lower end in the axial direction along an upward direction indicated by an arrow U and the downward direction indicated by the arrow D. The motor shaft 31*a* is inserted into the hole portion 31*b*3 so as to be movable in the axial direction. The hole portion 31*b*3 is provided coaxially with a center of rotation of the rotor 31*b*1. The rotor 31*b*1 is provided with an engagement position connected to the sun gear 31*e* on the lower end thereof. The engagement position connected to the sun gear 31*e* is configured by a polygonal shaft, for example, a hexagonal shaft, and in the sun gear 31*e*, an engagement position connected to the rotor 31*b*1 is formed by a polygonal hole, for example, a hexagonal hole. The outer gear 31*g* has teeth formed on an inner peripheral surface of an annular member, and is non-rotatably fixed concentrically with the sun gear 31*e*. The planetary gear 31*f* is rotatably supported by the carrier 31*h*, and meshes with the sun gear 31*e* and the outer gear 31*g* in a form of being interposed between the sun gear 31*e* and the outer gear 31*g*. Accordingly, in the speed reducer 31*d*, when the sun gear 31*e* rotates as the rotor 31*b*1 rotates, the carrier 31*h* rotates at a predetermined reduction ratio while the planetary gear 31*f* rotates.

The carrier 31*h* includes a plurality of gear rollers 31*i* that support the motor shaft 31*a* to be movable in the axial direction. The gear rollers 31*i* are rotatably supported by the carrier 31*h* in a disposition in which outer peripheral surfaces thereof are positioned on sides of a polygon, for example, a triangle, surrounding a center of rotation of the carrier 31*h*. The motor shaft 31*a* has a configuration in which a position in contact with the gear roller 31*i* is a flat surface. The motor shaft 31*a* has three flat surfaces in accordance with the disposition of the gear rollers 31*i*. Accordingly, the motor shaft 31*a* is supported at the center of rotation of the carrier 31*h* by the plurality of gear rollers 31*i*, and is movable in the axial direction by rotation of the gear rollers 31*i*. Thus, when the driving piston 30*a* moves in the downward direction in the driving cylinder 30 due to the air pressure of the compressed air, the motor shaft 31*a* moves in the downward direction integrally with the driving piston 30*a* and the driver bit 2.

When the flat surface of the motor shaft 31*a* comes into contact with the gear roller 31*i*, the motor shaft 31*a* rotates together with the carrier 31*h*. Thus, when the rotor 31*b*1 of the air motor 31 rotates due to the air pressure of the compressed air, the motor shaft 31*a* rotates together with the carrier 31*h* rotating at the predetermined reduction ratio.

The air motor 31 is provided on the upper side of the main body portion 10. In the air motor 31, the motor shaft 31*a* is provided coaxially with the driver bit 2. Accordingly, the air motor 31 is provided coaxially with the driving cylinder 30 on a second chamber 30*d* side with respect to the driving cylinder 30, that is, on a side opposite to the lower side on which the nose portion 12 is provided in the main body portion 10 and on the upper side of the driving cylinder 30 along the axial direction of the driver bit 2. In addition, with a configuration in which the motor shaft 31*a* is inserted into the hole portion 31*b*3 provided in the rotor 31*b*1 and a configuration in which the air motor 31 is provided on the upper side of the driving cylinder 30, the air motor 31 ensures a space in which the motor shaft 31*a* moving in an up-down direction operates.

The main valve 5 is vertically movably provided on an outer peripheral side of the driving cylinder 30. In addition, the main valve 5 is biased by a main valve spring 51 in the downward direction, which is a direction in which an air flow path 54 is closed. Further, in the main valve 5, the compressed air is supplied, via the start valve 6, from the main chamber 13 to a main valve upper chamber 52 in which the main valve spring 51 is provided, and the main valve 5 is pressed in the downward direction by the air pressure of the compressed air. In addition, in the main valve 5, the compressed air is supplied from the main chamber 13 to a main valve lower chamber 53, and the main valve 5 is pressed in the downward direction by the air pressure of the compressed air.

Accordingly, the main valve 5 opens and closes the air flow path 54 connecting the main chamber 13, the driving cylinder 30, and the air motor 31. The air flow path 54 is provided between the driving cylinder 30 and the main valve 5 on an inner peripheral side of the main valve 5 and on the outer peripheral side of the driving cylinder 30, and is connected to the main valve lower chamber 53 via the main valve 5. When the main valve 5 is not in operation, the main valve 5 is biased in the downward direction to be located at the bottom dead center position based on a relation, the relation being of a force of the main valve spring 51 and a balance between the air pressure of the compressed air supplied to the main valve upper chamber 52 and the air pressure of the compressed air supplied to the main valve lower chamber 53, thereby blocking the air flow path 54 between the main valve lower chamber 53 and the driving cylinder 30. On the other hand, when the main valve 5 is in operation, the main valve 5 is pressed in the upward direction by the air pressure of the compressed air supplied from the main chamber 13 to the main valve lower chamber 53 when the main valve upper chamber 52 is in communication with the atmosphere via the start valve 6, thereby opening the air flow path 54 between the main valve lower chamber 53 and the driving cylinder 30.

The start valve 6 includes a pilot valve 61, a valve stem 62, and a valve stem spring 63. The pilot valve 61 is configured to open and close the main valve upper chamber 52. The valve stem 62 is configured to cause the pilot valve 61 to operate. The valve stem spring 63 is configured to bias the pilot valve 61 in the upward direction and to bias the valve stem 62 in the downward direction.

In the start valve 6, the pilot valve 61 is pressed in the downward direction due to the air pressure of the compressed air supplied from the main chamber 13. In addition, in the start valve 6, the pilot valve 61 is pressed in the upward direction due to the air pressure of the compressed air supplied from the main chamber 13 to a valve lower chamber 64.

Accordingly, in the start valve 6, the pilot valve 61 is held at an upper position based on a relation between a balance of the air pressure of the compressed air and a force of the valve stem spring 63. On the other hand, in the start valve 6, when the valve stem 62 moves in the upward direction, the valve lower chamber 64 is in communication with the atmosphere, and thus the pilot valve 61 moves in the downward direction due to the air pressure of the compressed air. Further, when the pilot valve 61 moves in the downward direction, a passage through which the main valve upper chamber 52 communicates with the atmosphere is opened.

The trigger 60 is provided on the lower side of the handle portion 11 and is rotatable about 60*c* as a fulcrum in response to an operation of an operator. The trigger 60 is biased in the direction separating from the valve stem 62 of the start valve 6 by a trigger spring 60*d*.

The trigger 60 includes a contact lever 60*a* that causes the valve stem 62 of the start valve 6 to operate. The contact lever 60*a* is supported by the trigger 60 so as to be rotatable about a shaft 60*b* as a fulcrum. The contact lever 60*a* does not come into contact with the valve stem 62 only in a state where an operation of pulling the trigger 60 is performed. In contrast, when the contact lever 60*a* is pressed by an upper arm (not illustrated) of the contact arm 8 in the state where the operation of pulling the trigger 60 is performed, the valve stem 62 is caused to move in the upward direction. Accordingly, the start valve 6 is operated by a combination of an operation of the trigger 60 and an operation of being pressed by the contact arm 8.

The contact arm 8 includes a lower arm 80 and an upper arm (not illustrated). The lower arm 80 is configured to come into contact with the driven member 300. The upper arm (not illustrated) is configured to cause the contact lever 60*a* of the trigger 60 to operate. The lower arm 80 is supported by the nose portion 12 so as to be movable in the up-down direction. The lower arm 80 is biased in the downward direction by a biasing member (not illustrated).

The screw driving machine 1A includes a tightening depth adjusting portion 86. The tightening depth adjusting portion 86 defines an upper fulcrum position of the lower arm 80 and is configured to cause the first control valve 72 to operate when the lower arm 80 moves to the upper fulcrum position.

The tightening depth adjusting portion 86 includes an adjusting portion main body 86*a* and an abutting portion 86*b* whose protrusion height with respect to the adjusting portion main body 86*a* is adjustable. The tightening depth adjusting portion 86 is supported so as to be movable along moving directions of the lower arm 80 indicated by the arrows U and D, and is biased in the downward direction indicated by the arrow D by a biasing member 86*c* such as a coil spring.

The tightening depth adjusting portion 86 has a configuration in which the adjusting portion main body 86*a* and the abutting portion 86*b* are joined by, for example, screwing a male screw and a female screw. In the tightening depth adjusting portion 86, a dial portion 86*d* for causing the adjusting portion main body 86*a* to rotate is exposed to an outside of the main body portion 10. The adjusting portion main body 86 is caused to rotate by an operation of the dial portion 86*d*, whereby a protrusion amount of the abutting portion 86*b* with respect to the adjusting portion main body 86*a* is switched, and an entire length of the tightening depth adjusting portion 86 is changed.

In the tightening depth adjusting portion 86, the abutting portion 86*b* faces the lower arm 80. In the tightening depth adjusting portion 86, the abutting portion 86*b* and the lower arm 80 are separated from each other in a state where the lower arm 80 moves to the bottom dead center position. In the tightening depth adjusting portion 86, when the lower arm 80 moves in the upward direction as indicated by the arrow U from the bottom dead center position, the lower arm 80 comes into contact with the abutting portion 86*b*.

When the tightening depth adjusting portion 86 is pressed up by the lower arm 80 moving in the arrow U direction and moves to a position where the adjusting portion main body 86*a* comes into contact with a movement regulating portion 86*e*, the tightening depth adjusting portion 86 regulates the lower arm 80 from further moving in the arrow U direction.

Accordingly, a position of the lower arm 80 regulated by the movement to the position where the tightening depth adjusting portion 86 comes into contact with the movement regulating portion 86*e* becomes the upper fulcrum position of the lower arm 80.

In the tightening depth adjusting portion 86, the protrusion amount of the abutting portion 86*b* with respect to the adjusting portion main body 86*a* is switched by the operation of the dial portion 86*d*, and the entire length of the tightening depth adjusting portion 86 is changed. When the entire length of the tightening depth adjusting portion 86 is changed, the top dead center position of the lower arm 80 moves. When the top dead center position of the lower arm 80 moves, a protrusion amount of the driver bit 2 with respect to a lower end surface of the lower arm 80 changes, the driver bit 2 being moved to the bottom dead center position with respect to the lower end surface of the lower arm 80, and a tightening depth of the screw 200 with respect to the driven member 300 changes.

The on-off valve 7 is vertically movably supported by an on-off valve cylinder 73 provided in the motor housing 31*c*. In the on-off valve cylinder 73, an on-off valve lower chamber 73*a* is provided on the lower side of the on-off valve 7 indicated by the arrow D, and an on-off valve upper chamber 73*b* is provided on the upper side of the on-off valve 7 indicated by the arrow U. The on-off valve 7 is operated due to the compressed air supplied from the main chamber 13 and, in a state where the compressed air is not supplied to the on-off valve upper chamber 73*b*, the on-off valve 7 moves in the upward direction indicated by the arrow U due to the compressed air supplied to the on-off valve lower chamber 73*a*. In addition, when the compressed air is supplied to the on-off valve upper chamber 73*b*, the on-off valve upper chamber 73*b* moves in the downward direction as indicated by the arrow D.

The on-off valve 7 is configured to open and close the air flow path 74 connected to the air motor 31 by moving in the up-down direction. The air flow path 74 is in communication with the air flow path 54 on a downstream side of the main valve 5. In the air flow path 74, a flow of air between the main chamber 13 and the air motor 31 is blocked when the on-off valve 7 moves in the downward direction and is closed. In addition, in the air flow path 74, when the on-off valve 7 moves in the upward direction and opens, communication between the main chamber 13 and the air motor 31 is established. The on-off valve 7 is provided on a side portion of the air motor 31.

The controller 70 includes a control valve cylinder 75, a first control valve 72, a communication passage 75*c*, and a second control valve 71. The first control valve 72 is accommodated in the control valve cylinder 75 and partitions an inside of the control valve cylinder 75 into a third chamber 75*a* and a fourth chamber 75*b*. The communication passage 75*c* allows the inside of the driving cylinder 30 and the third chamber 75*a* in the control valve cylinder 75 to communicate with each other via the timer chamber 32. The second control valve 71 is located on an arrow U direction side with respect to the first control valve 72 and is disposed away from the first control valve 72.

In addition, the controller 70 includes a first biasing member 72*b* and a second biasing member 71*a*. The first biasing member 72*b* is a first biasing portion configured to bias the first control valve 72 in an arrow D direction. The second biasing member 71*a* is a second biasing portion configured to bias the second control valve 71 in an arrow D direction.

In the control valve cylinder 75, the third chamber 75*a* is provided on the lower side of the first control valve 72 indicated by the arrow D, and the fourth chamber 75*b* is provided on the upper side of the first control valve 72 indicated by the arrow U. In the control valve cylinder 75, the third chamber 75*a* is in communication with the timer chamber 32 via the communication passage 75*c*, and is in communication with the space in the driving cylinder via the timer chamber 32. In addition, in the control valve cylinder 75, the third chamber 75*a* is in communication with an outside of a body of the screw driving machine 1A via an exhaust passage 75*d*.

The first control valve 72 is vertically movably supported by the control valve cylinder 75 along the upward direction indicated by the arrow U and the downward direction indicated by the arrow D. In addition, in the first control valve 72, a rod-shaped coupling portion 72*a* extending in the up-down direction is coupled in a form protruding in the upward direction indicated by the arrow U. Further, the first control valve 72 is biased in the arrow D direction by the first biasing member 72*b* such as a coil spring. The first control valve 72 faces the adjusting portion main body 86*a* of the tightening depth adjusting portion 86.

The first control valve 72 is configured to be movable to a standby position P100 which is the bottom dead center position by moving in the downward direction indicated by the arrow D, and is configured to be movable to a later-described operation completion position which is the top dead center position by moving in the upward direction indicated by the arrow U.

The first control valve 72 moves to the standby position P100 by being biased in the arrow D direction by the first biasing member 72*b*.

The first control valve 72 includes a seal portion 72*c* that opens and closes the exhaust passage 75*d*. In a state where the first control valve 72 stands by at the standby position P100, the seal portion 72*c* moves to a position to open the exhaust passage 75*d*, and the third chamber 75*a* of the control valve cylinder 75 is in communication with the outside of the body of the screw driving machine 1A via the exhaust passage 75*d*. When the first control valve 72 moves to a later-described pressure control start position between the standby position P100 and the operation completion position in a process of moving from the standby position P100 to the operation completion position, the seal portion 72*c* moves to a position to close the exhaust passage 75*d*.

The first control valve 72 standing by at the standby position P100 is pressed and operated by the lower arm 80 via the tightening depth adjusting portion 86, and moves from the standby position P100 to the pressure control start position. In addition, when the first control valve 72 moves to the pressure control start position, the first control valve 72 is operated due to the compressed air supplied from the timer chamber 32 and moves from the pressure control start position to the operation completion position. In the process of moving from the pressure control start position to the operation completion position, the first control valve 72 presses the second control valve 71 via the coupling portion 72*a* to cause the second control valve 71 to operate.

The second control valve 71 is configured by a rod-shaped member extending in the up-down direction, and is vertically movably supported with respect to the on-off valve 7. The second control valve 71 moves to a standby position P110 by being biased in the arrow D direction by the second biasing member 71*a*. In addition, the second control valve 71 is operated by being pressed by the first control valve 72. The second control valve 71 is movable from the standby position P110 to the later-described operation completion position and is configured to cause the on-off valve 7 to operate by switching whether to supply the compressed air to the on-off valve upper chamber 73*b* of the on-off valve cylinder 73.

The controller 70 includes an adjustment member 71*b* configured to adjust a biasing force of the second biasing member 71*a*. The adjustment member 71*b* configures an adjustment portion. For example, a screw is formed on an outer periphery of the adjustment member 71*b*, and a length of the second biasing member 71*a* in an expansion and contraction direction is adjusted by adjusting a tightening amount of the screw.

The screw feeding portion 9 includes a feeding member 91 and a feed piston 92. The feeding member 91 is configured to feed the screw coupling body 203. The feed piston 92 is configured to cause the feeding member 91 to operate. The feeding member 91 is supported so as to be movable in a direction approaching and a direction separating from the injection passage 12*a* of the nose portion 12. The feeding member 91 is configured to feed the screw 200, which is locked by the coupling band 201 and is coupled by the coupling band 201, to the injection passage 12*a*.

The feed piston 92 is coupled to the feeding member 91 and is provided in a feed cylinder 93 so as to be slidable. The feed cylinder 93 is connected to the blowback chamber 33 via a feed flow path 94, and is supplied with compressed air from the blowback chamber 33.

The feed piston 92 is operated due to an air pressure of the compressed air supplied from the blowback chamber 33 to cause the feeding member 91 to move in the direction separating from the injection passage 12*a*. In addition, when the feeding member 91 is biased by a biasing member 95 such as a coil spring in the direction approaching the injection passage 12*a* and the air pressure in the feed cylinder 93 decreases, the feed piston 92 causes the feeding member 91 to move in the direction approaching the injection passage 12*a* by being biased by the biasing member 95.

The magazine 90 is provided on the lower side of the handle portion 11 and is coupled to the nose portion 12. The screw coupling body 203 illustrated in FIG. 5 is accommodated in the magazine 90. The magazine 90 is located in an intersecting direction intersecting with the injection passage 12*a*. Incidentally, the intersecting direction may be an extending direction of the handle portion 11.

The screw driving machine 1A has a supply passage 96*a*. The supply passage 96*a* connects the injection passage 12*a* and the magazine 90. The screw coupling body 203 is fed through the supply passage 96*a* along a first direction indicated by an arrow B intersecting with the extending direction of the injection passage 12*a*.

The supply passage 96*a* is formed by a part of a member configuring the magazine 90 and a part of a member configuring the nose portion 12. The supply passage 96*a* extends along the first direction indicated by the arrow B between the injection passage 12*a* and a space in the magazine 90 in which the screw coupling body 203 in a form of being wound in a spiral shape is accommodated.

In addition, the screw driving machine 1A has a discharge port 12*c*. The discharge port 12*c* connects the injection passage 12*a* and an outside of the nose portion 12. The coupling band 201, from which the screw 200 has been injected, is discharged through the nose portion 12 along the first direction indicated by the arrow B.

In the nose portion 12, the discharge port 12*c* is located on a side opposite to the supply passage 96*a* via the injection passage 12*a* on an extension line of the supply passage 96*a*. The discharge port 12*c* is formed by providing an opening having a size through which the coupling band 201 can pass in a part of a surface facing the first direction indicated by the arrow B.

In the screw driving machine 1A, a side portion of the magazine 90, a side portion of the supply passage 96*a*, a side portion of the injection passage 12*a*, and a side portion of the discharge port 12*c* are opened, the side portions facing a second direction indicated by an arrow C. The second direction intersects with the direction, in which the injection passage 12*a* extends and which is indicated by the arrow A, and the first direction indicated by the arrow B.

The screw driving machine 1A includes a magazine cap portion 97. The magazine cap portion 97 includes a tip portion on an injection passage 12*a* side and a base end portion opposite to the tip portion in a direction intersecting with the injection passage 12*a*. By the tip portion rotating in a direction separating from and approaching the magazine 90 with the base end portion as a fulcrum, the magazine cap portion 97 is configured to open and close the magazine 90 by the tip portion separating from and approaching the magazine 90. The magazine cap portion 97 is configured to cover a part of the opened side portion of the magazine 90 and the opened side portion of the supply passage 96*a* in an openable and closable manner. In addition, the screw driving machine 1A includes a door portion 98. The door portion 98 is integrally coupled to the magazine cap portion 97. The door portion 98 is configured to cover a part of the opened side portion of the injection passage 12*a*, the opened side portion of the discharge port 12*c*, and the opened side portion of the supply passage 96*a* in an openable and closable manner.

The magazine cap portion 97 is an example of a lid portion. The magazine cap portion 97 has a shape that extends from a convex portion which can cover the screw coupling body 203 in a form of being wound in a spiral shape toward a side where the nose portion 12 is provided and covers a part of the supply passage 96*b*. In the magazine cap portion 97, an end portion on a side opposite to a side to which the door portion 98 is coupled is supported by the magazine 90 via a support shaft 97*a*, so that the magazine cap portion 97 is rotatable with respect to the magazine 90 with the support shaft 97*a* as a fulcrum. In the magazine cap portion 97, the biasing member (not illustrated) such as a torsion coil spring is inserted into the support shaft 97*a*, and the magazine cap portion 97 is biased in an opening direction with respect to the magazine 90. The magazine cap portion 97 may be configured not to be biased by the biasing member in the opening direction with respect to the magazine 90.

The door portion 98 is an example of the lid portion. The door portion 98 is supported by the magazine cap portion 97 via a coupling shaft 98*a* and is rotatable with respect to the magazine cap portion 97 with the coupling shaft 98*a* as a fulcrum. An axial direction of the coupling shaft 98*a* is a direction intersecting the first direction that is indicated by the arrow B. An axial direction of the support shaft 97*a* via which the magazine cap portion 97 is supported by the magazine 90 and the axial direction of the coupling shaft 98*a* via which the door portion 98 is supported by the magazine cap portion 97 are parallel.

The magazine cap portion 97 and the door portion 98 are changeable between a linearly extending form and a bent form by relative rotation thereof with the coupling shaft 98*a* as a fulcrum. In the door portion 98, a biasing member 98*b* such as a torsion coil spring is inserted into the coupling shaft 98*a*, and the magazine cap portion 97 and the door portion 98 are biased in a bending direction. The biasing member 98*b* is an example of a biasing portion.

In addition, the magazine cap portion 97 and the door portion 98 are configured to open and close the side portion of the magazine 90, the side portion of the supply passage 96*a*, the side portion of the injection passage 12*a*, and the side portion of the discharge port 12*c* by an integral rotating operation with the support shaft 97*a* as a fulcrum.

In the screw driving machine 1A, when the magazine cap portion 97 and the door portion 98 are in the open state, the side portion of the magazine 90, the side portion of the supply passage 96*a*, the side portion of the injection passage 12*a*, and the side portion of the discharge port 12*c* are exposed. The side portion of the magazine 90, the side portion of the supply passage 96*a*, the side portion of the injection passage 12*a*, and the side portion of the discharge port 12*c* open in a form of being connected along the first direction indicated by the arrow B. The screw driving machine 1A has an opening portion 12*d* in the side portion of the injection passage 12*a* and the side portion of the discharge port 12*c*. The opening portion 12*d* is formed in a form of connecting an opening in the side portion of the injection passage 12*a* and an opening in the side portion of the discharge port 12*c* along the first direction indicated by the arrow B. In the screw driving machine 1A, the opening portion 12*d* is exposed when the magazine cap portion 97 and the door portion 98 are in the open state. The door portion 98 exposes the opening portion 12*d* in a state where the discharge port 12*c* is opened.

In addition, in the screw driving machine 1A, when the magazine cap portion 97 and the door portion 98 are in the closed state, openings in the side portion of the magazine 90, the side portion of the supply passage 96*a*, the side portion of the injection passage 12*a*, and the side portion of the discharge port 12*c* are covered. The door portion 98 covers the opening portion 12*d* in the state where the discharge port 12*c* is opened.

The screw driving machine 1A includes a plurality of engaging portions configured to hold the magazine cap portion 97 and the door portion 98 in a closed state where the magazine 90 is closed. In this example, a first engaging portion 99*a* and a second engaging portion 99*b* that hold the magazine cap portion 97 and the door portion 98 in the closed state are provided. The first engaging portion 99*a* is provided on the door portion 98 on a side that is close to the coupling shaft 98*a* coupled to the magazine cap portion 97. The first engaging portion 99*a* includes an engaging convex portion 99*a*2, an operation portion 99*a*3, and a biasing member 99*a*4. The engaging convex portion 99*a*2 is configured to enter an engaged concave portion 99*a*1 provided in the main body portion 10. The operation portion 99*a*3 is configured to receive an operation of inserting and removing the engaging convex portion 99*a*2 into and from the engaged concave portion 99*a*1. The biasing member 99*a*4 such as a coil spring is configured to bias the first engaging portion 99*a* in a direction in which the engaging convex portion 99*a*2 enters the engaged concave portion 99*a*1. The biasing member 99*a*4 is an example of a biasing portion. The first engaging portion 99*a* is displaced between a holding position and a releasing position. In the holding position, the first engaging portion 99*a* holds the door portion 98 and the magazine cap portion 97 in the closed state by the engaging convex portion 99*a*2 being biased by the biasing member 99*a*4 to enter the engaged concave portion 99*a*1 and being engaged with the main body portion 10. In the releasing position, engagement with the main body portion 10 is released by separating the engaging convex portion 99*a*2 from the engaged concave portion 99*a*1 by the operation of the operation portion 99*a*3, whereby the first engaging portion 99*a* allows the door portion 98 and the magazine cap portion 97 to be openable and closable.

The second engaging portion 99*b* is an example of an engaging portion. The second engaging portion 99*b* is provided on the nose portion 12. The second engaging portion 99*b* is provided on both sides of the discharge port 12*c* along the extending direction of the injection passage 12*a* indicated by the arrow A. That is, the second engaging portion 99*b* is provided to face both sides of the door portion 98 along the extending direction of the injection passage 12*a* indicated by the arrow A with respect to the door portion 98 in the closed state. In addition, the second engaging portion 99*b* is provided in the vicinity of the injection passage 12*a*. The second engaging portion 99*b* is entirely or partially provided on a side closer to the nose portion 12 than a position H1 of the most protruding portion in the second direction indicated by the arrow C in the door portion 98 in the closed state. Providing the second engaging portion 99*b* at such a position is referred to as providing the second engaging portion 99*b* in the vicinity of the injection passage 12*a*.

The door portion 98 has an engaging convex portion 99*c* engageable with the second engaging portion 99*b* at a tip portion 98*c* of the door portion 98. In addition, the second engaging portion 99*b* has an engaging concave portion 99*d* with which the engaging convex portion 99*c* engages. The engaging convex portion 99*c* is an example of a convex portion. The engaging convex portion 99*c* is provided on both sides of the door portion 98 along the extending direction of the injection passage 12*a* indicated by the arrow A. The engaging convex portion 99*c* has a columnar shape protruding from the door portion 98 along the axial directions of the support shaft 97*a* and the coupling shaft 98*a*.

The engaging concave portion 99*d* is an example of a concave portion. The engaging concave portion 99*d* is formed by a groove portion that extends along the first direction indicated by the arrow B and has a shape into which the engaging convex portion 99*c* is insertable. The engaging concave portion 99*d* is opened on a side facing the magazine 90 on a side opposite to the first direction, allowing the engaging convex portion 99*c* to be inserted and removed. In the second engaging portion 99*b*, a guide portion 99*e* connected to the engaging concave portion 99*d* is provided on a side of the engaging concave portion 99*d* that is close to the nose portion 12. The guide portion 99*e* is an extension portion of a surface on the side of the engaging concave portion 99*d* that is close to the nose portion 12, and extends along the first direction. In addition, the second engaging portion 99*b* has an introduction portion 99*f* on a side of the engaging concave portion 99*d* that is far from the nose portion 12. The introduction portion 99*f* is an end portion on the side of the engaging concave portion 99*d* that is far from the nose portion 12. The introduction portion 99*f* is formed at a position where the introduction portion 99*f* enters in the first direction more than the guide portion 99*e*.

The magazine cap portion 97 and the door portion 98 change between the linearly extending form and the bent form by the relative rotation thereof with the coupling shaft 98*a* as a fulcrum, thereby changing a distance from the support shaft 97*a* to the engaging convex portion 99*c*.

A length from the support shaft 97*a* to the guide portion 99*e* is formed to be longer than the distance from the support shaft 97*a* to the engaging convex portion 99*c* when the magazine cap portion 97 and the door portion 98 change to the bent form by the relative rotation thereof with the coupling shaft 98*a* as a fulcrum. Accordingly, when the magazine cap portion 97 and the door portion 98 change to the bent form, the guide portion 99*e* is located on a rotation trajectory of the engaging convex portion 99*c* around the support shaft 97*a*. In addition, a length from the support shaft 97*a* to the introduction portion 99*f* is formed to be shorter than the distance from the support shaft 97*a* to the engaging convex portion 99*c* when the magazine cap portion 97 and the door portion 98 change to the bent form by the relative rotation thereof with the coupling shaft 98*a* as a fulcrum. Accordingly, when the magazine cap portion 97 and the door portion 98 change to the bent form, the introduction portion 99*f* is located outside the rotation trajectory of the engaging convex portion 99*c* around the support shaft 97*a*. Further, the length from the support shaft 97*a* to the guide portion 99*e* is formed to be shorter than the distance from the support shaft 97*a* to the engaging convex portion 99*c* when the magazine cap portion 97 and the door portion 98 change to the linearly extending form by the relative rotation thereof with the coupling shaft 98*a* as a fulcrum. Accordingly, in a state where the magazine cap portion 97 and the door portion 98 change to the bent form by the relative rotation thereof with the coupling shaft 98*a* as a fulcrum, even when the magazine cap portion 97 and the door portion 98 rotate with the support shaft 97*a* as a fulcrum, the engaging convex portion 99*c* does not come into contact with the introduction portion 99*f* The engaging convex portion 99*c* is in contact with the guide portion 99*e*. The magazine cap portion 97 and the door portion 98 may be configured as a lid portion that is fixedly integrated, instead of being configured to be connected in a movable form via the coupling shaft 98*a*. In the lid portion having such a configuration, a side opposite to a side on which a portion corresponding to the door portion is provided is supported such that the lid portion is openable and closable by a rotating operation with the support shaft as a fulcrum with respect to the magazine 90.

The screw driving machine 1A includes a screw detector 210 configured to detect presence or absence of the screw 200 (screw coupling body 203). The screw detector 210 is an example of a consumable detector. The screw detector 210 is supported by the magazine cap portion 97 via a shaft 210*a*. The screw detector 210 includes a detection terminal 210*b* that is provided on one side across the shaft 210*a*. The detection terminal 210*b* is contactable with the screw coupling body 203 passing through the supply passage 96*a*. In addition, the screw detector 210 includes a confirmation portion 210*c* which is provided on the other side across the shaft 210*a*. The confirmation portion 210*c* is configured to protrude to an outside of the magazine cap portion 97 from a window portion 97*b* provided in the magazine cap portion 97 and to be retracted to an inside of the magazine cap portion 97. Further, the screw detector 210 includes a biasing member 210*d* such as a coil spring configured to bias the detection terminal 210*b* in a direction of the supply passage 96*a*.

In the screw detector 210, when the screw coupling body 203 is accommodated in the magazine 90, a portion pulled out from a state of being wound in a spiral shape is passed through the supply passage 96*a*, and the magazine cap portion 97 and the door portion 98 are closed, the detection terminal 210*b* comes into contact with the screw coupling body 203 and is pressed. Accordingly, the screw detector 210 rotates with the shaft 210*a* as a fulcrum, and the confirmation portion 210*c* is retracted from the window portion 97*b* of the magazine cap portion 97 to the inside of the magazine cap portion 97.

{Example of Opening and Closing Operations of Magazine}

Figure 6A:
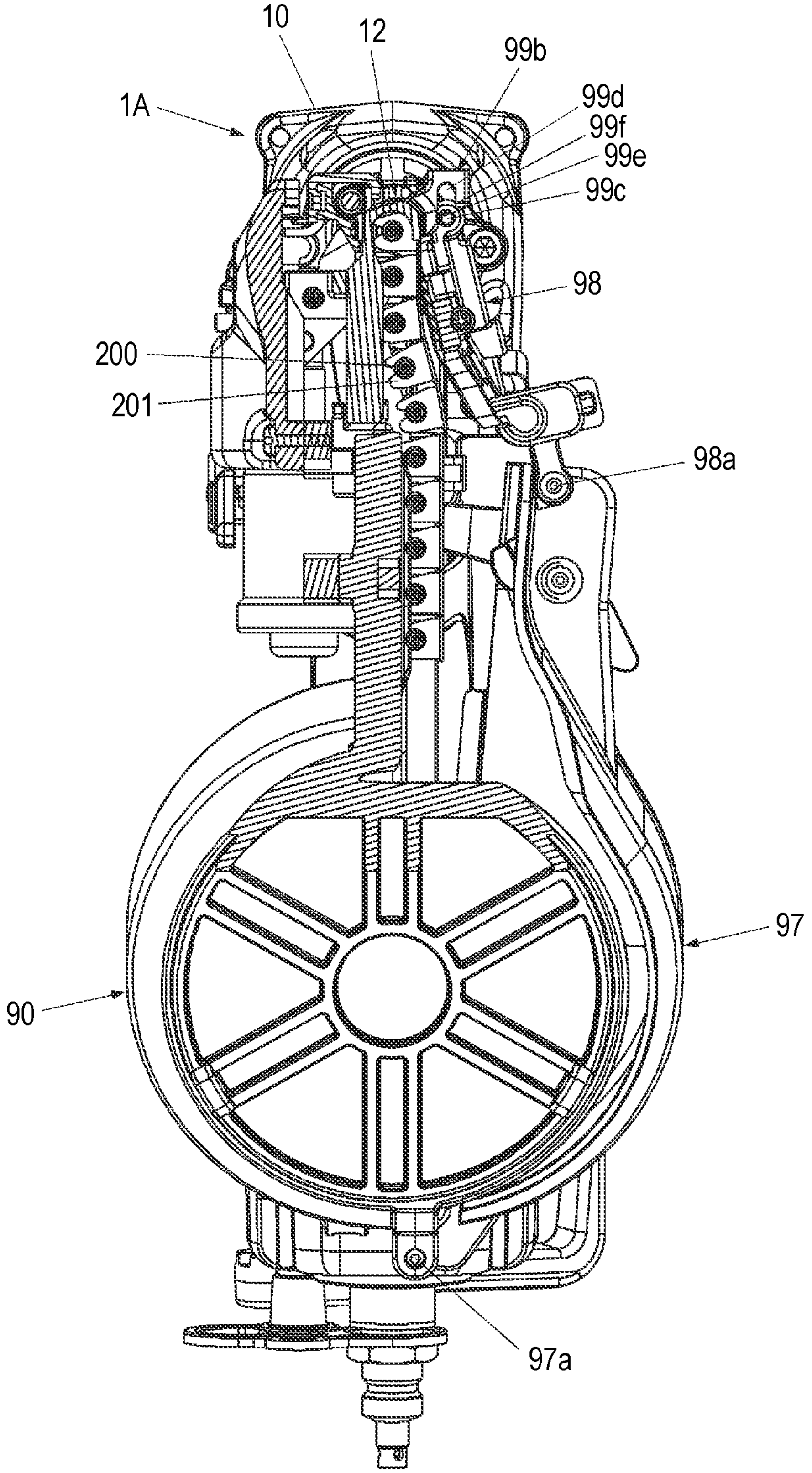
FIG. 6A is a cross-sectional view illustrating an example of opening and closing operations of a magazine cap portion and a door portion.
Figure 6B:
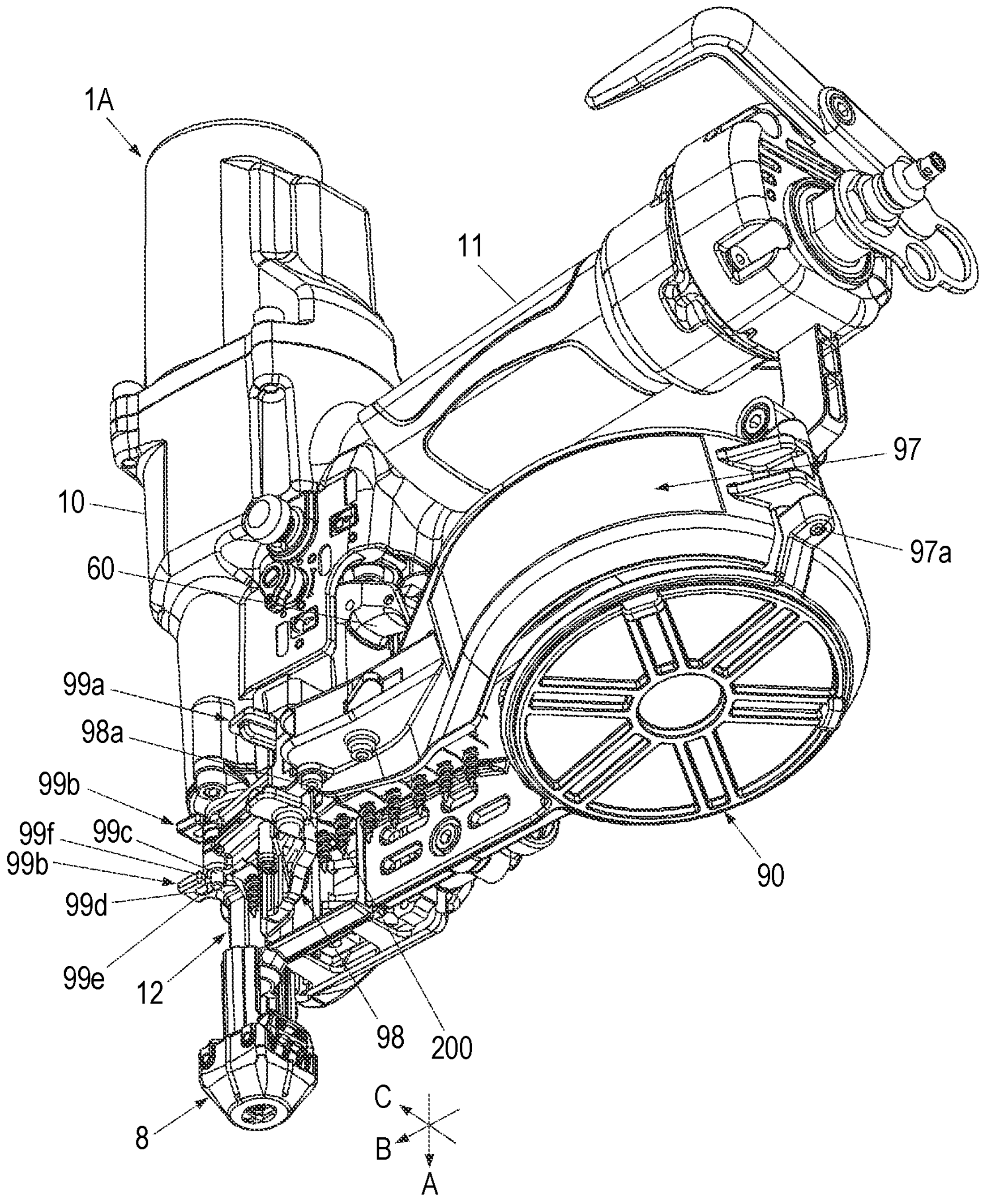
FIG. 6B is a perspective view illustrating the example of the opening and closing operations of the magazine cap portion and the door portion.

FIG. 6A is a cross-sectional view illustrating an example of opening and closing operations of a magazine cap portion and a door portion, FIG. 6B is a perspective view illustrating the example of the opening and closing operations of the magazine cap portion and the door portion. An example of opening and closing operations of the magazine cap portion 97 and the door portion 98 will be described.

As illustrated in FIGS. 1A and 1B, when the magazine cap portion 97 and the door portion 98 are in the open state where the magazine 90 is opened, the magazine cap portion 97 and the door portion 98 change to the bent form by the relative rotation thereof with the coupling shaft 98*a* as a fulcrum. From this state, when the magazine cap portion 97 and the door portion 98 are caused to rotate in a closing direction with the support shaft 97*a* as a fulcrum, the engaging convex portion 99*c* of the door portion 98 does not come into contact with the introduction portion 99*f* on a nose portion 12 side. Then, the engaging convex portion 99*c* comes into contact with the guide portion 99*e*, and as illustrated in FIGS. 6A and 6B, the engaging convex portion 99*c* of the door portion 98 moves to a position facing the engaging concave portion 99*d* on the nose portion 12 side.

From this state, when the vicinity of a portion where the magazine cap portion 97 and the door portion 98 are coupled by the coupling shaft 98*a* is pressed in a direction in which the magazine cap portion 97 and the door portion 98 are in the linearly extending form, the engaging convex portion 99*c* of the door portion 98 moves along the guide portion 99*e* on the nose portion 12 side. Accordingly, the engaging convex portion 99*c* is guided by the guide portion 99*e* to enter the engaging concave portion 99*d* and further moves along the engaging concave portion 99*d*. When the magazine cap portion 97 and the door portion 98 are closed, the engaging concave portion 99*d* causes the door portion 98, which is bent with the coupling shaft 98*a* as a fulcrum with respect to the magazine cap portion 97, to extend linearly against a biasing force of the biasing member 98*b*. When the magazine cap portion 97 and the door portion 98 are in the open state, the first engaging portion 99*a* is engaged with the main body portion 10 and moves to the holding position that holds the door portion 98 and the magazine cap portion 97 in the closed state.

Accordingly, when the magazine cap portion 97 and the door portion 98 are in the closed state, the magazine cap portion 97 and the door portion 98 are in the linearly extending form, and a side of the door portion 98 that is close to the coupling shaft 98*a* coupled to the magazine cap portion 97 is held in the closed state by the first engaging portion 99*a*. In addition, the tip portion 98*c*, which is a side that is close to the nose portion 12 opposite to the coupling shaft 98*a* coupled to the magazine cap portion 97 in the door portion 98, is held in the closed state by the second engaging portion 99*b* by the engagement between the engaging convex portion 99*c* and the engaging concave portion 99*d*.

In order to open the magazine cap portion 97 and the door portion 98, the first engaging portion 99*a* is moved to the releasing position that releases the engagement with the main body portion 10 to open and close the door portion 98 and the magazine cap portion 97. When holding in the closed state by the first engaging portion 99*a* is released, the magazine cap portion 97 and the door portion 98 change to the bent form by the relative rotation thereof with the coupling shaft 98*a* as a fulcrum by biasing of the biasing member (not illustrated).

When the magazine cap portion 97 and the door portion 98 change from the closed state to the bent form, the engaging convex portion 99*c* of the door portion 98 moves to an outside of the introduction portion 99*f* and is guided by the guide portion 99*e*, thereby moving to a position where the engaging convex portion 99*c* is separated from the engaging concave portion 99*d* on the nose portion 12 side. As a result, the magazine cap portion 97 and the door portion 98 can be in the open state by the rotating operation with the support shaft 97*a* as a fulcrum.

{Operation Example of Screw Driving Machine}

Figure 7:
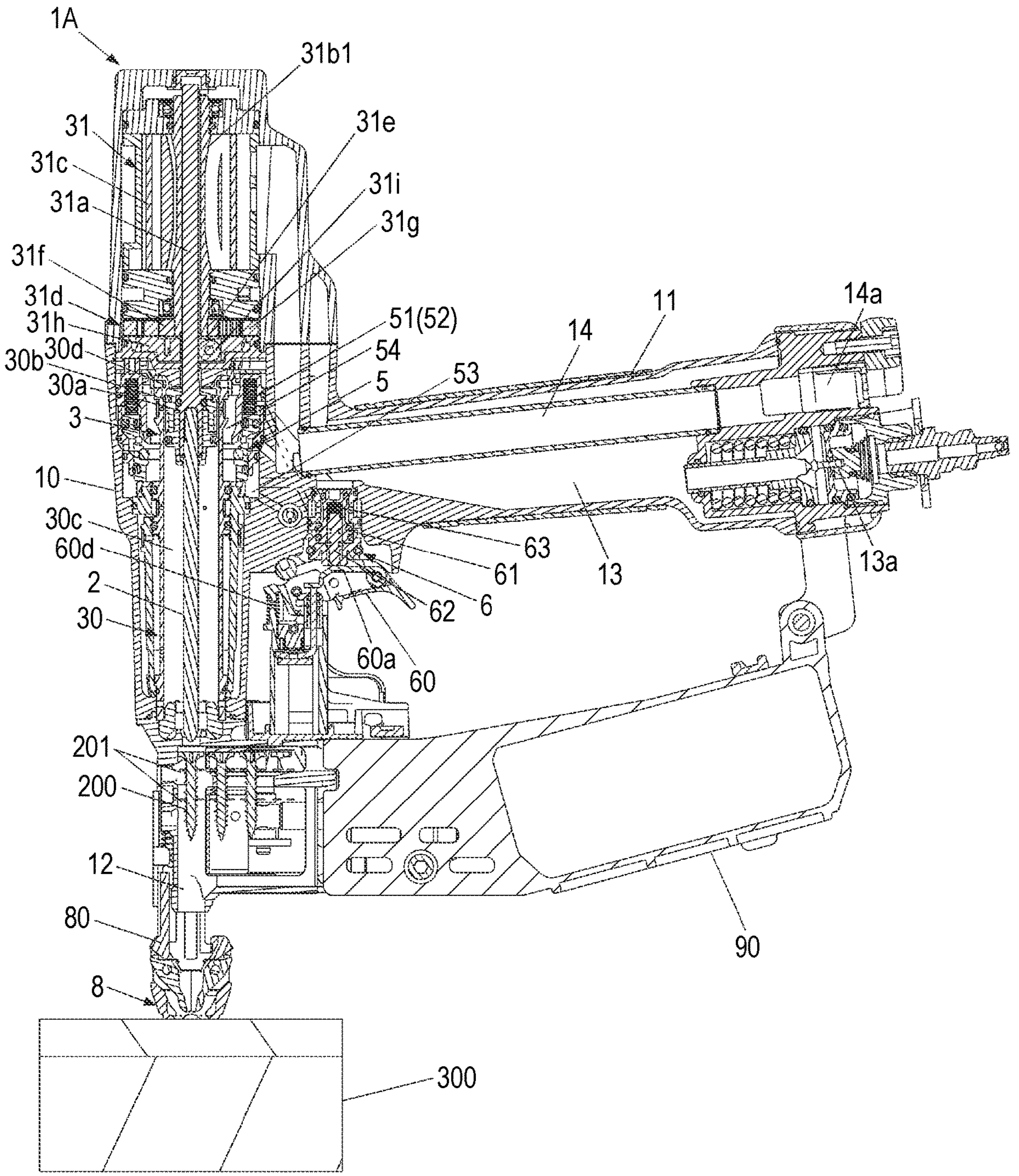
FIG. 7 is a side sectional view of the screw driving machine illustrating an example of an operation of driving a screw into a driven member and tightening the screw.

FIG. 7 is a side sectional view of the screw driving machine illustrating an example of an operation of driving a screw into a driven member and tightening the screw, and FIGS. 8A, 8B, 8C, 8D, 8E, 8F, and 8G are front sectional views of the screw driving machine illustrating examples of an operation of driving the screw into the driven member and tightening the screw. In addition, FIG. 9 is a bottom sectional view of the screw driving machine illustrating an example of a state where the screw in the magazine is used.

Next, an example of an operation of the screw driving machine 1A in which the driving and tightening of the screw 200 are performed will be described.

In the screw driving machine 1A, the operator holds the handle portion 11, and the contact arm 8 is pressed against the driven member 300. In the screw driving machine 1A, when the contact arm 8 is pressed against the driven member 300, the lower arm 80 moves in the upward direction due to the relative movement with respect to the main body portion 10. By the operation of the contact arm 8 in which the lower arm 80 moves in the upward direction due to the relative movement with respect to the main body portion 10, the upper arm (not illustrated) of the contact arm 8 moves to a position where the contact lever 60*a* of the trigger 60 is caused to operate. Accordingly, when the operation of pulling the trigger 60 is performed, as illustrated in FIG. 7, the contact lever 60*a* presses the valve stem 62 of the start valve 6, and the start valve 6 is operated.

Figure 8A:
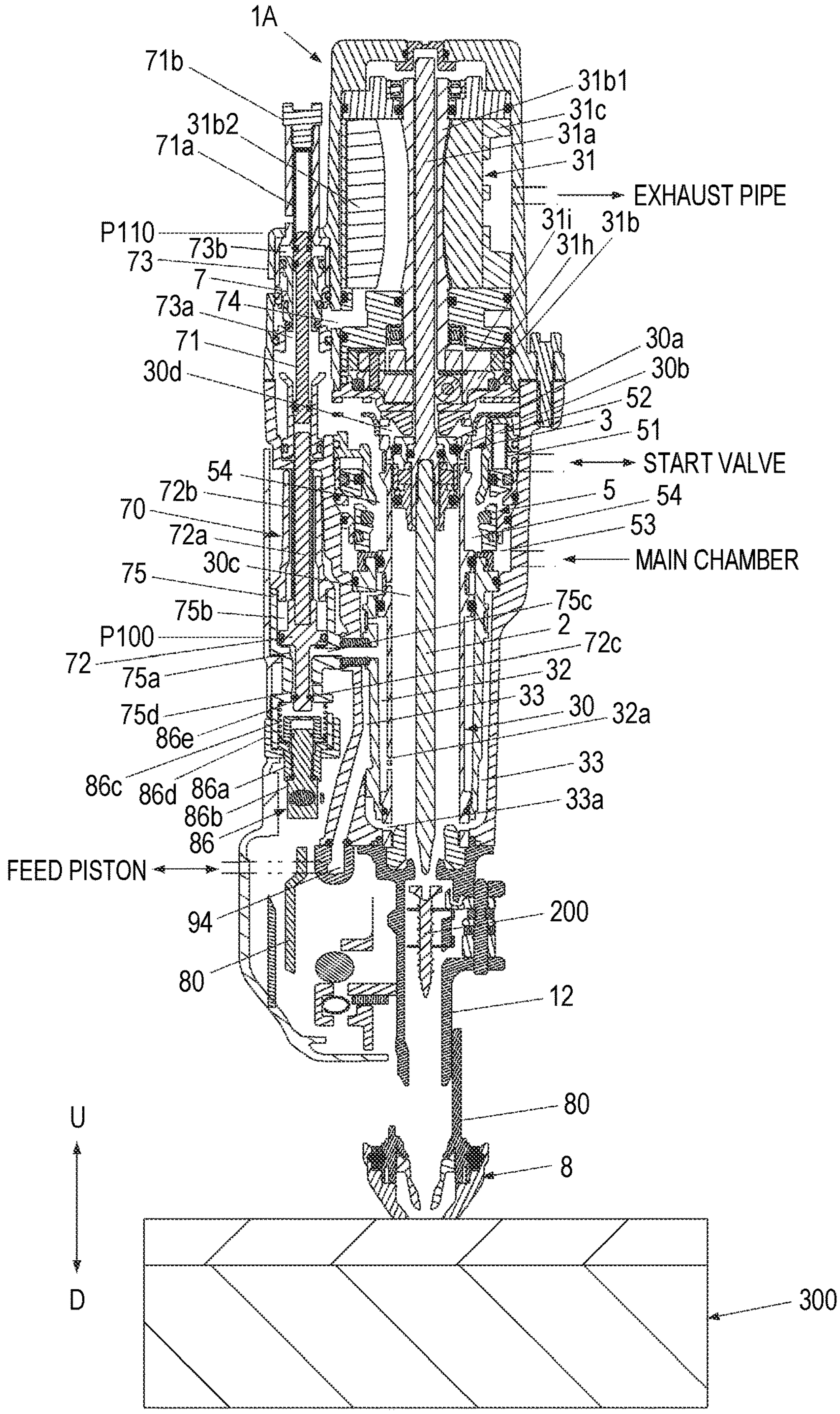
FIG. 8A is a front sectional view of the screw driving machine illustrating an example of the operation of driving the screw into the driven member and tightening the screw.
Figure 8B:
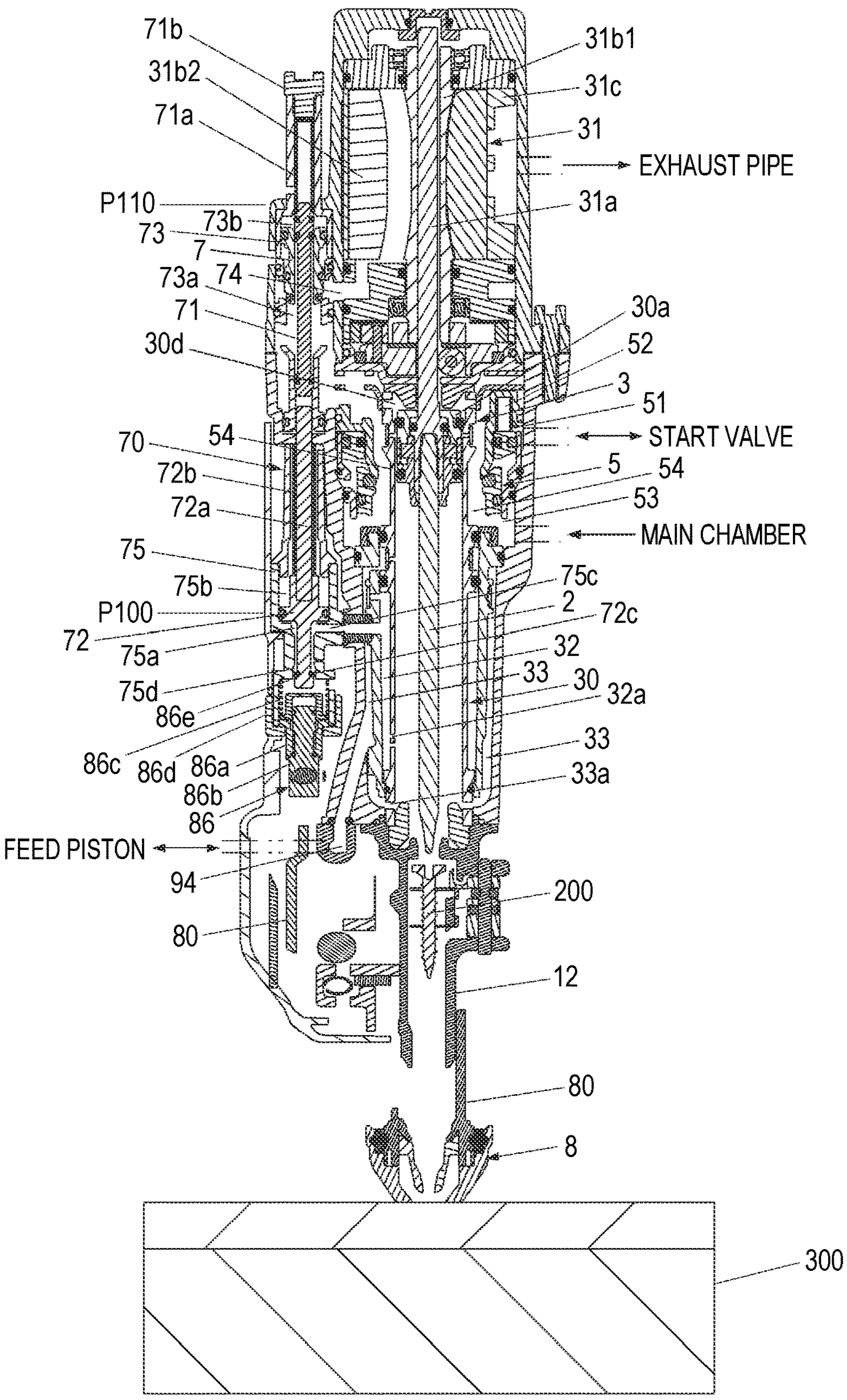
FIG. 8B is a front sectional view of the screw driving machine illustrating the example of the operation of driving the screw into the driven member and tightening the screw.

When the start valve 6 is operated, the main valve 5 is operated as illustrated in FIG. 8B, and the compressed air is supplied to the driving cylinder 30 and the on-off valve 7. When the compressed air is supplied to the driving cylinder 30, the driving piston 30*a* to which the driver bit 2 is attached is pressed by the air pressure, and as illustrated in FIG. 8C, the driver bit 2 (driving piston 30*a*) moves in the downward direction from the top dead center position to the bottom dead center position, and the screw 200 is driven into the driven member 300.

When the driver bit 2 (driving piston 30*a*) moves in the downward direction from the top dead center position, air on the lower side of the driving piston 30*a* is supplied to the blowback chamber 33, and pressure in the blowback chamber 33 increases.

When the driver bit 2 (driving piston 30*a*) moves to the bottom dead center position, the compressed air in the blowback chamber 33 is supplied from the feed flow path 94 of the screw feeding portion 9 to the feed piston 92. Accordingly, the feeding member 91 moves in a direction separating from the injection passage 12*a*. In the operation of the feeding member 91 moving in the direction separating from the injection passage 12*a*, the feeding member 91 is separated from the coupling band 201, and the screw coupling body 203 is not fed.

Figure 8C:
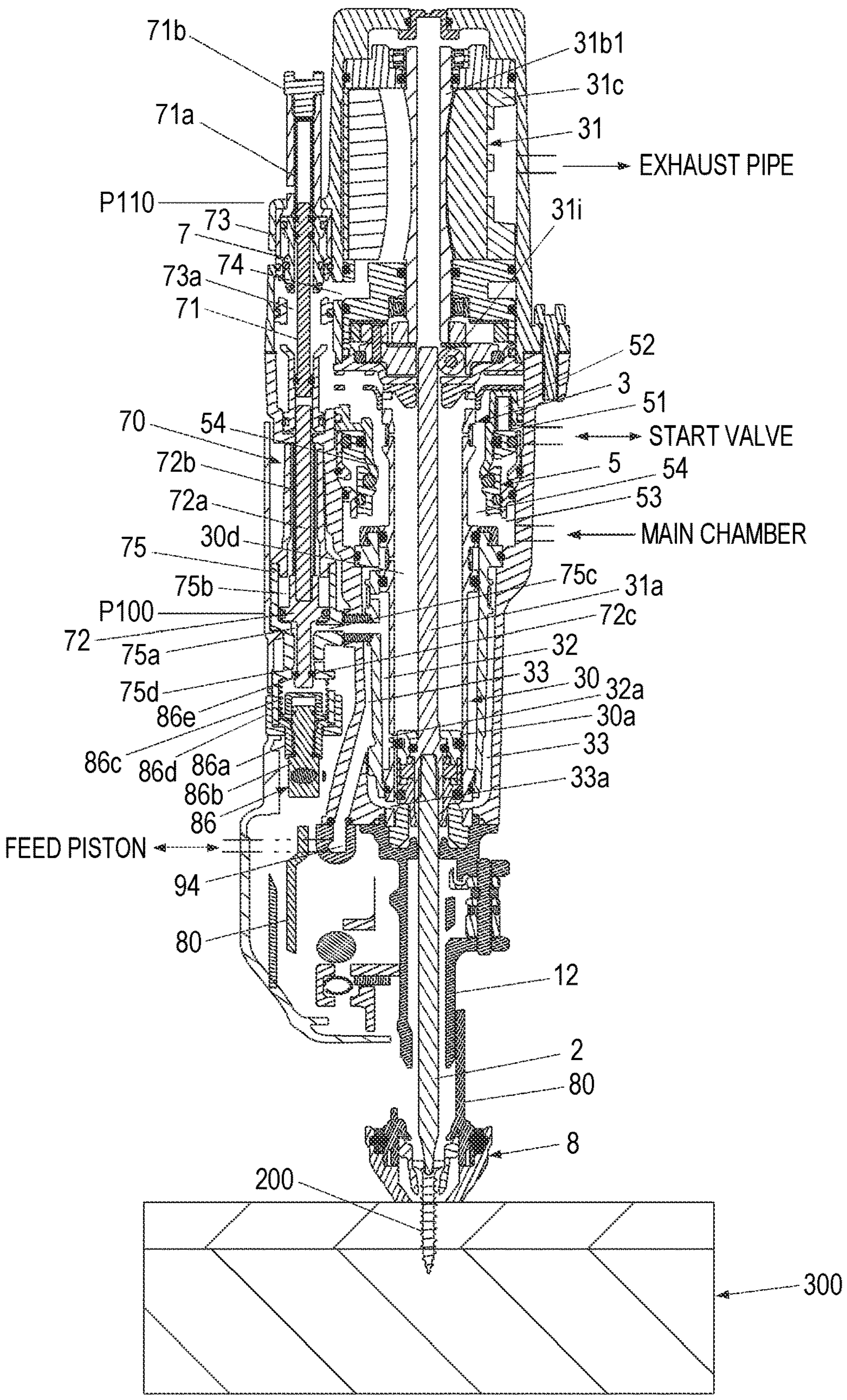
FIG. 8C is a front sectional view of the screw driving machine illustrating the example of the operation of driving the screw into the driven member and tightening the screw.
Figure 9:
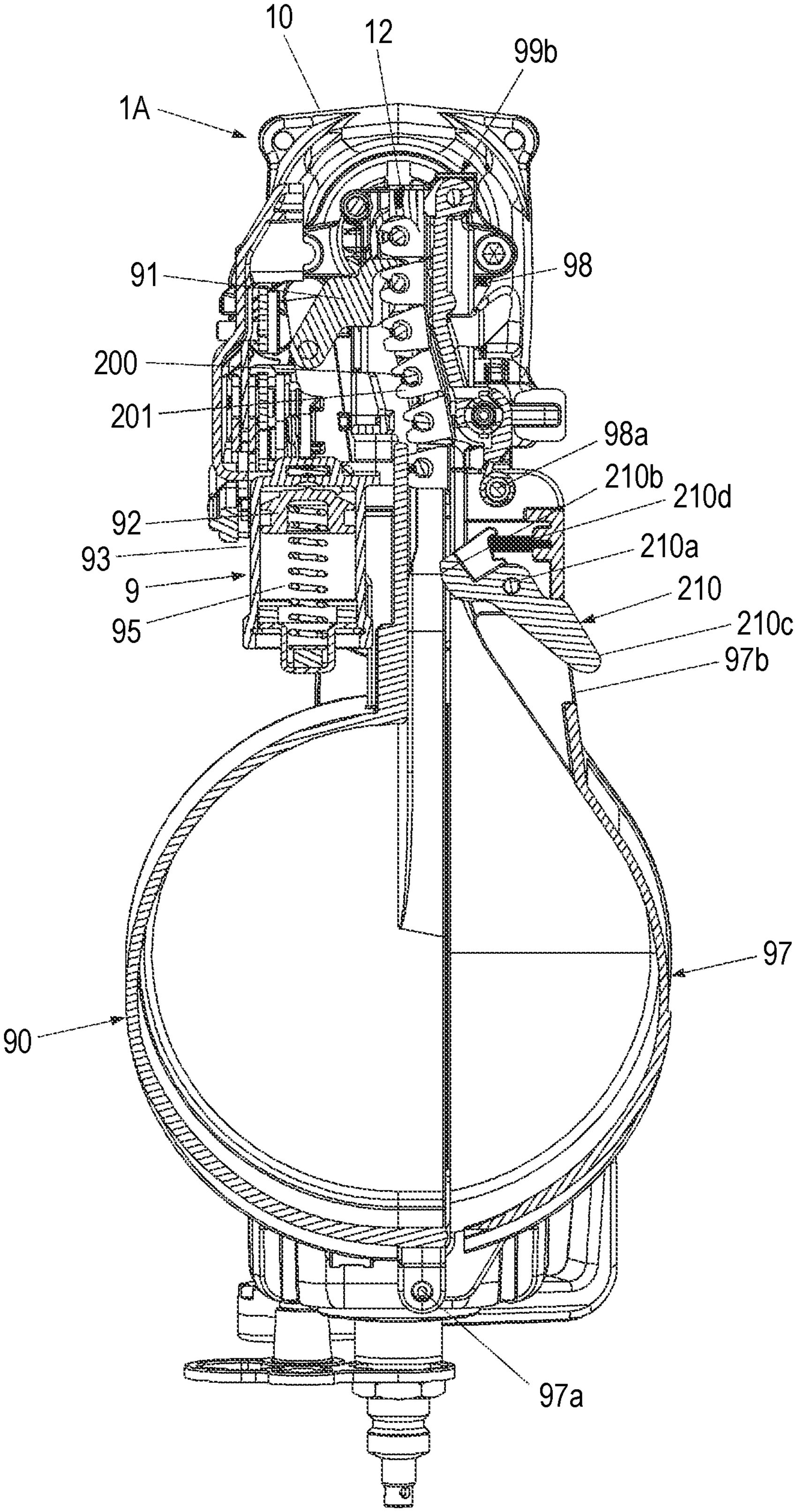
FIG. 9 is a bottom sectional view of the screw driving machine illustrating an example of a state where the screw in the magazine is used.

When the main valve 5 is operated and the compressed air is supplied to the on-off valve lower chamber 73*a* of the on-off valve cylinder 73 which is a space on the lower side of the on-off valve 7, as illustrated in FIG. 8C, the on-off valve 7 is operated by the air pressure, and the compressed air is supplied to the air motor 31.

Figure 8D:
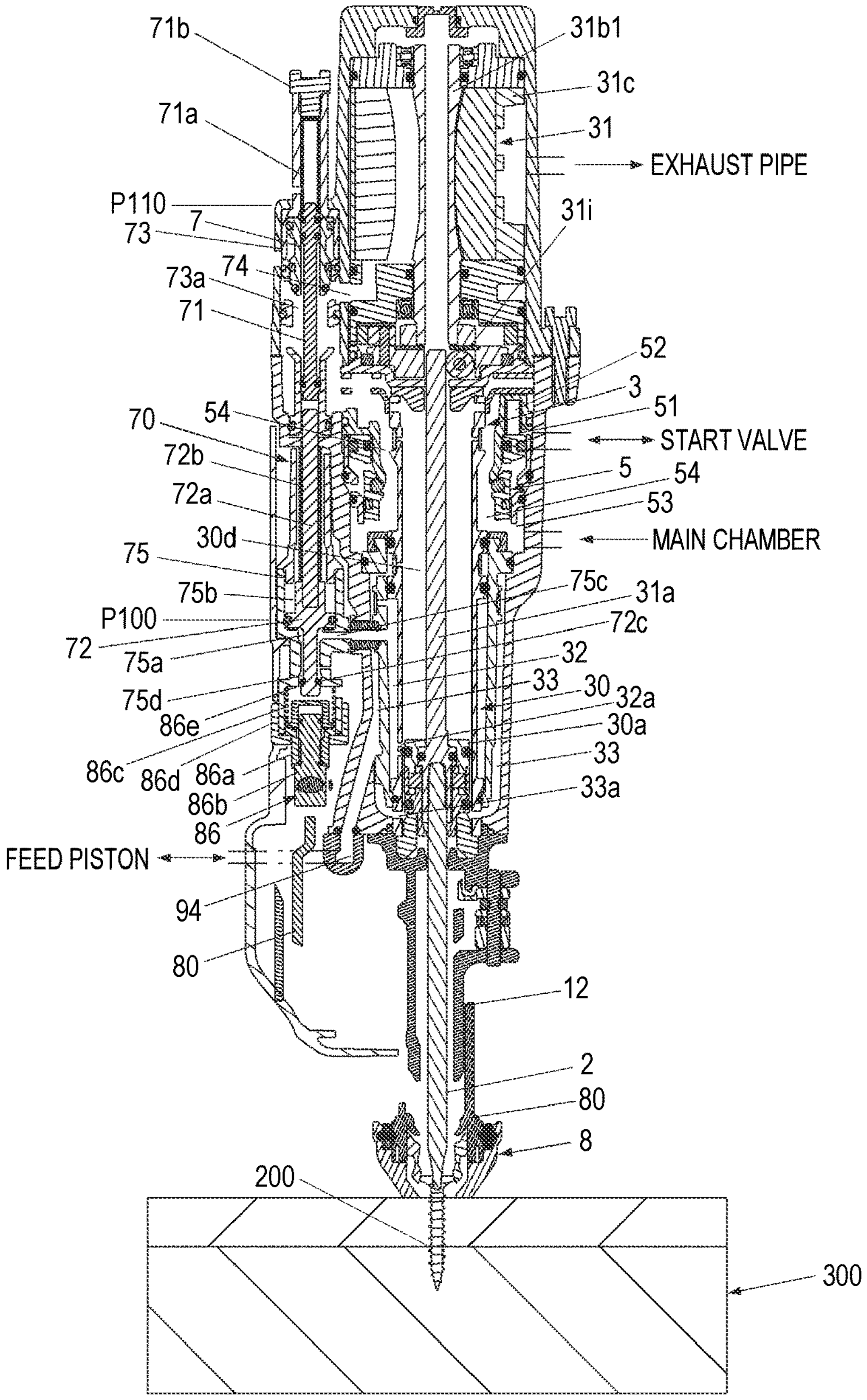
FIG. 8D is a front sectional view of the screw driving machine illustrating the example of the operation of driving the screw into the driven member and tightening the screw.

When the compressed air is supplied to the air motor 31, the driver bit 2 rotates, and as illustrated in FIG. 8D, the screw 200 driven into the driven member 300 is tightened. In addition, by the operation of pressing the contact arm 8 against the driven member 300, the main body portion 10 further moves in the downward direction following the tightening of the screw 200.

Figure 8E:
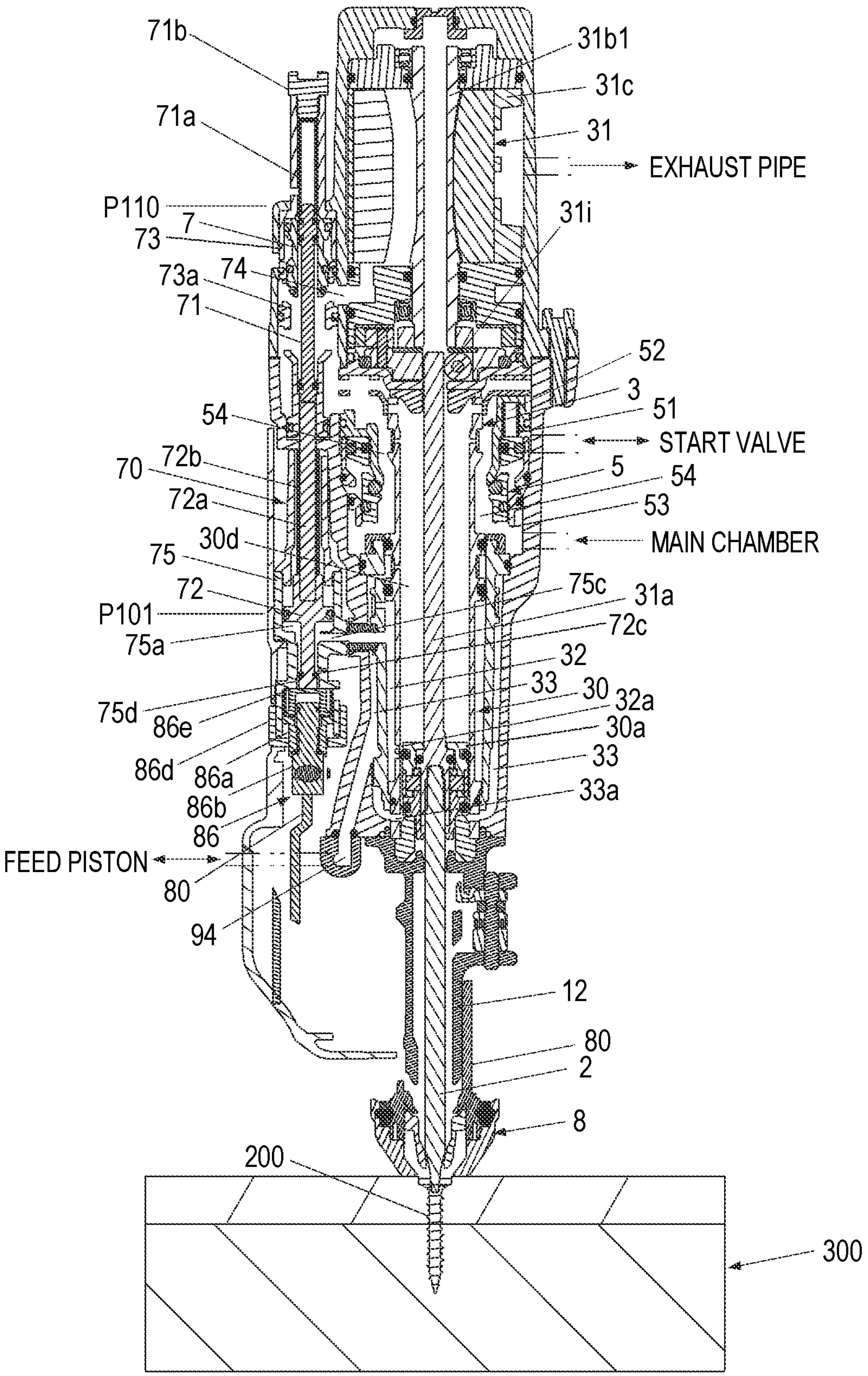
FIG. 8E is a front sectional view of the screw driving machine illustrating the example of the operation of driving the screw into the driven member and tightening the screw.

By the operation of pressing the contact arm 8 against the driven member 300, the main body portion 10 further moves in the downward direction following the tightening of the screw 200, and the lower arm 80 moves relatively in the upward direction. When the lower arm 80 moves relatively in the upward direction, the tightening depth adjusting portion 86 is pressed in the upward direction. When the tightening depth adjusting portion 86 is pressed up by the lower arm 80 moving in the arrow U direction and the tightening depth adjusting portion 86 moves to a position where the tightening depth adjusting portion 86 comes into contact with the movement regulating portion 86*e*, the lower arm 80 is regulated from further moving in the upward direction. Accordingly, a position of the lower arm 80 regulated by the movement to the position where the tightening depth adjusting portion 86 comes into contact with the movement regulating portion 86*e* becomes the upper fulcrum position of the lower arm 80. When the lower arm 80 moves to the top dead center position, as illustrated in FIG. 8E, the lower arm 80 presses the first control valve 72 in the upward direction via the tightening depth adjusting portion 86, and the first control valve 72 moves from the standby position P100 illustrated in FIG. 8A and the like to a pressure control start position P101.

In the control valve cylinder 75, the third chamber 75*a* is normally in communication with the space in the driving cylinder 30 via the communication passage 75*c* and the side hole flow path 32*a* of the driving cylinder 30. When the main valve 5 is operated and the seal portion 30*b* of the driving piston 30*a* passes through the side hole flow path 32*a*, the compressed air is supplied from the second chamber 30*d* in the driving cylinder 30, which is an upper chamber of the driving cylinder, to the timer chamber 32. During a period in which the first control valve 72 moves to the pressure control start position P101 from a state where the first control valve 72 stands by at the standby position P100, the seal portion 72*c* of the first control valve 72 is at a position where the exhaust passage 75*d* is opened, and the third chamber 75*a* of the control valve cylinder 75 is in communication with the outside of the body of the screw driving machine 1A via the exhaust passage 75*d*. Accordingly, even when the compressed air is supplied from the timer chamber 32 to the third chamber 75*a* of the control valve cylinder 75, the third chamber 75*a* is maintained at atmospheric pressure, and the first control valve 72 does not operate with the air pressure.

Figure 8F:
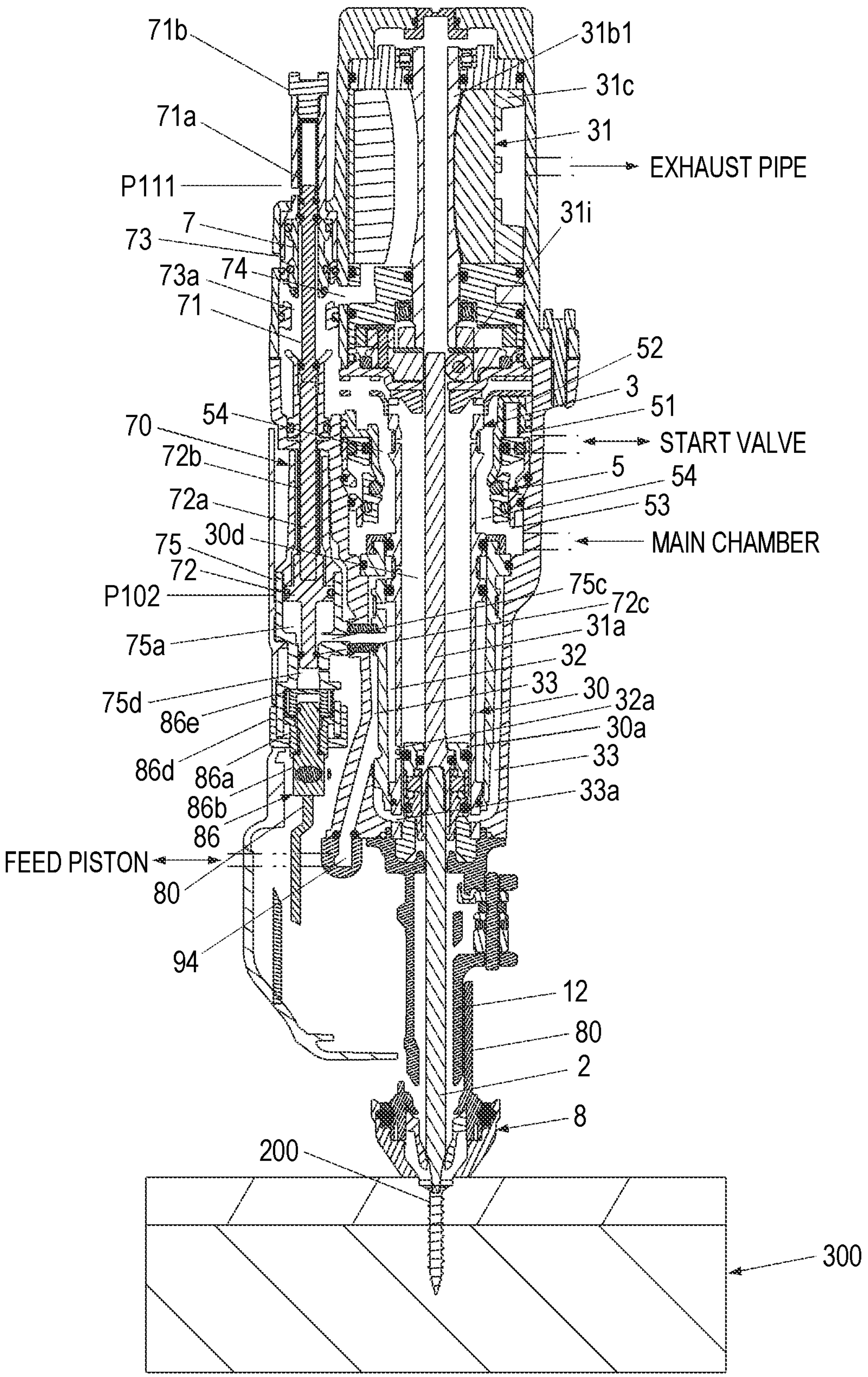
FIG. 8F is a front sectional view of the screw driving machine illustrating the example of the operation of driving the screw into the driven member and tightening the screw.

When the first control valve 72 moves to the pressure control start position P101, the seal portion 72*c* of the first control valve 72 closes the exhaust passage 75*d*. When the air flow path to an outside of a gas passing through the exhaust passage 75*d* is blocked, pressure in the control valve cylinder 75 increases due to the air pressure of the compressed air supplied from the timer chamber 32 to the third chamber 75*a* of the control valve cylinder 75. When the pressure in the control valve cylinder 75 increases, the first control valve 72 is operated due to the air pressure, and as illustrated in FIG. 8F, the first control valve 72 further moves in the upward direction.

When the first control valve 72 further moves in the upward direction from the pressure control start position P101 due to the air pressure of the compressed air and the first control valve 72 moves to the second control valve operation start position, the first control valve 72 presses the second control valve 71 in the upward direction. When the second control valve 71 moves to an operation completion position P111 by movement of the first control valve 72 to an operation completion position P102, the compressed air is supplied to the on-off valve upper chamber 73*b* of the on-off valve cylinder 73 which is a space on the upper side of the on-off valve 7.

Figure 8G:
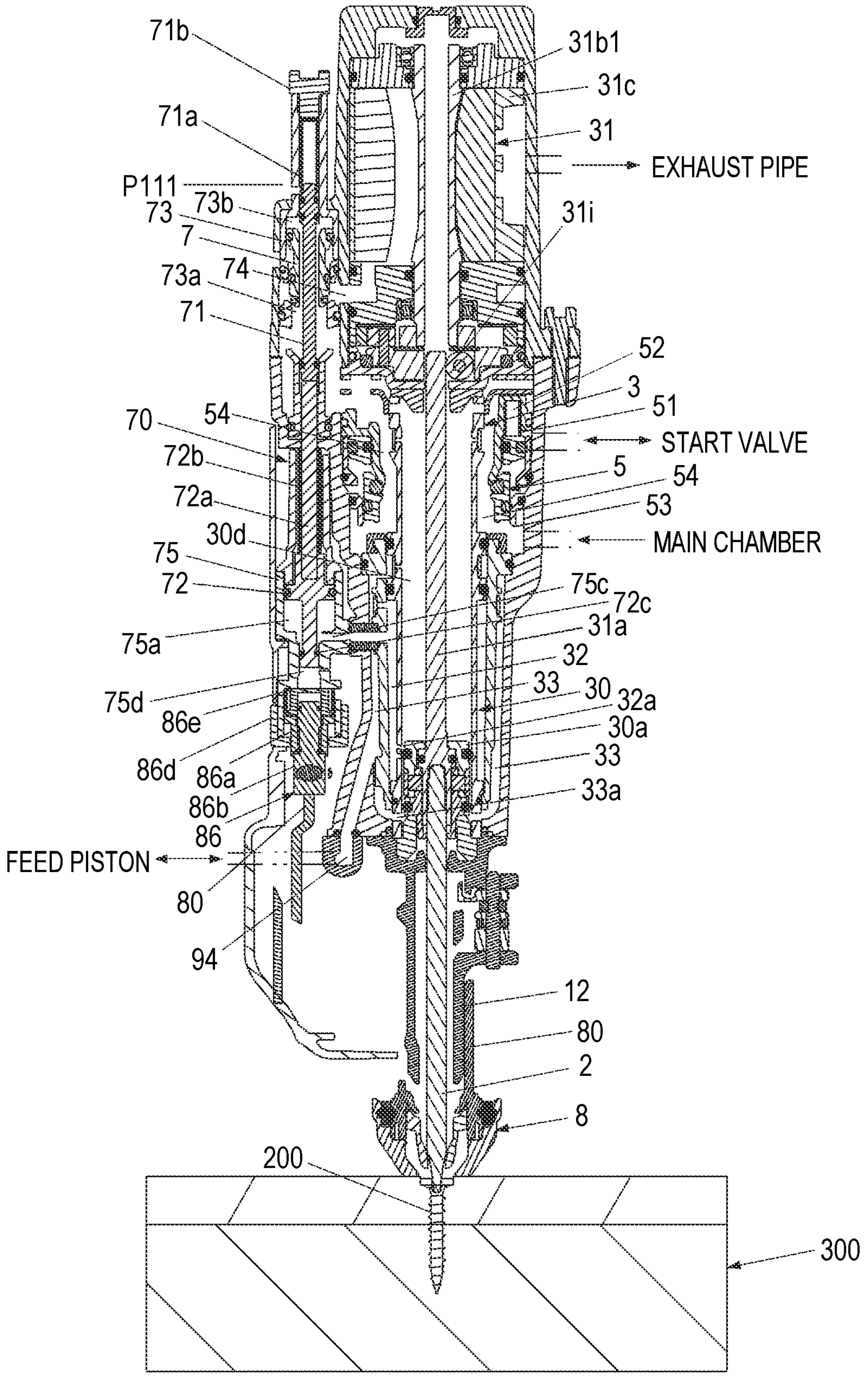
FIG. 8G is a front sectional view of the screw driving machine illustrating the example of the operation of driving the screw into the driven member and tightening the screw.

When the compressed air is supplied to the on-off valve upper chamber 73*b*, the on-off valve 7 moves in the downward direction as illustrated in FIG. 8G due to a difference between pressure acting on the on-off valve 7 due to the compressed air supplied to the on-off valve upper chamber 73*b* and pressure acting on the on-off valve 7 due to the compressed air supplied to the on-off valve lower chamber 73*a*, and supply of the compressed air to the air motor 31 is stopped. When the supply of the compressed air to the air motor 31 is stopped, rotation of the driver bit 2 is stopped.

When the rotation of the driver bit 2 is stopped and the tightening of the screw 200 is completed, the operator weakens the force for pressing the contact arm 8 against the driven member 300 and causes the main body portion 10 to move in a direction separating from the driven member 300.

When the main body portion 10 moves in the direction separating from the driven member 300, the pressing of the contact lever 60*a* by the upper arm (not illustrated) is released, and the contact lever 60*a* is separated from the start valve 6. When the contact lever 60*a* is separated from the start valve 6, the main valve 5 is closed, and the supply of the compressed air to the driving cylinder 30 is stopped.

When the supply of the compressed air to the driving cylinder 30 is stopped and the pressure in the driving cylinder 30 decreases to the atmospheric pressure, the compressed air in the blowback chamber 33 is supplied to a space on the lower side of the driving piston 30*a*, and the driver bit 2 (driving piston 30*a*) moves to the top dead center position.

When the driver bit 2 moves to the top dead center position and the pressure in the blowback chamber 33 decreases, the supply of the compressed air to the feed piston 92 is stopped. When the supply of the compressed air to the feed piston 92 is stopped, the feeding member 91 coupled to the feed piston 92 moves in a direction approaching the injection passage 12*a* by the biasing of the biasing member 95. In the operation of the feeding member 91 moving in the direction approaching the injection passage 12*a*, the feeding member 91 is engaged with the coupling band 201, and a next screw 200 is fed to the injection passage 12*a*.

In the operation of feeding the next screw 200 to the injection passage 12*a*, the coupling band 201 after the screw 200 is injected is discharged from the discharge port 12*c* to the outside of the nose portion 12.

In a case where the screw coupling body 203 remains in the magazine 90 in the operation of feeding the next screw 200 to the injection passage 12*a*, the screw coupling body 203 pulled out from a portion wound in a spiral shape in the magazine 90 is passed through the supply passage 96*a*. In addition, even in a case where the screw coupling body 203 is removed from the magazine 90, the screw coupling body 203 comes into contact with the detection terminal 210*b* until a terminal of the screw coupling body 203 passes through the detection terminal 210*b* of the screw detector 210.

As described above, in a case where the predetermined number of screws 200 that do not pass through the detection terminal 210*b* of the screw detector 210 remain in the supply passage 96*a* at the terminal of the screw coupling body 203, in the screw detector 210, the detection terminal 210*b* comes into contact with the screw coupling body 203 and is pressed as illustrated in FIG. 4C. Accordingly, the screw detector 210 rotates with the shaft 210*a* as a fulcrum, and the confirmation portion 210*c* is retracted from the window portion 97*b* of the magazine cap portion 97 to the inside of the magazine cap portion 97. Thus, the operator can confirm that the predetermined number of screws 200 remain by visually checking the window portion 97*b* of the magazine cap portion 97 or by touching with a hand.

On the other hand, as illustrated in FIG. 9, in a case where the screw 200 is used until the terminal of the screw coupling body 203 passes through the detection terminal 210*b* of the screw detector 210, the detection terminal 210*b* of the screw detector 210 is separated from the screw coupling body 203. Accordingly, the screw detector 210 is biased by the biasing member 210*d* and rotates with the shaft 210*a* as a fulcrum, and the confirmation portion 210*c* protrudes from the window portion 97*b* of the magazine cap portion 97 to an outside of the magazine cap portion 97. Thus, the operator can confirm that the number of remaining screws 200 is equal to or less than the predetermined number before the screws 200 are removed by visually checking the confirmation portion 210*c* protruding from the window portion 97*b* of the magazine cap portion 97 or by touching with a hand. Accordingly, it is possible to select an executable operation according to the remaining number of the screws 200.

{Example of Operation and Effect of Screw Driving Machine}

In the screw driving machine 1A, the magazine cap portion 97 and the door portion 98 are integrally coupled to open and close the magazine 90. When the magazine cap portion 97 and the door portion 98 are in the open state, the side portion of the magazine 90, the side portion of the supply passage 96*a*, the side portion of the injection passage 12*a*, and the side portion of the discharge port 12*c* are exposed. Accordingly, in a case where the screw coupling body 203 is to be loaded, a task of accommodating the screw coupling body 203 wound in a spiral shape in the magazine 90 and inserting the screw coupling body 203 pulled out from the portion wound in a spiral shape into the supply passage 96*a* from the lateral side can be easily performed. In addition, the task of inserting the screw coupling body 203 into the supply passage 96*a* can be easily performed by aligning a position of the screw 200 with the injection passage 12*a*.

In the related art, a configuration is provided in which a magazine cap portion provided in a magazine and a door portion provided in a nose portion are opened and closed, respectively. Therefore, the door portion provided in the nose portion is configured to be opened and closed by a rotating operation with a shaft provided in the nose portion as a fulcrum. In contrast, in the screw driving machine 1A, the magazine cap portion 97 and the door portion 98 are integrally coupled to open and close the magazine 90. In the magazine cap portion 97, the end portion on the side opposite to the side to which the door portion 98 is coupled is supported by the magazine 90 via the support shaft 97*a*. Thus, in the screw driving machine 1A, as illustrated in FIG. 1A, when the magazine cap portion 97 and the door portion 98 are in the open state, the opening portion 12*d* is exposed, the opening portion 12*d* being formed in a form in which the opening in the side portion of the injection passage 12*a* and the opening in the side portion of the discharge port 12*c* are connected along the first direction indicated by the arrow B. When the door portion 98 is in the open state, the opening portion 12*d* is exposed in a form of being connected to the discharge port 12*c*.

Accordingly, in a case where an unused screw coupling body 203 is to be loaded, the tape 204 of a portion protruding out from a tip of the screw coupling body 203 can be inserted into the opening portion 12*d* from the lateral side without peeling off the entire tape 204 fixing the screw coupling body 203.

In a case where the screw coupling body 203 in use is to be taken out, the screw coupling body 203 before injection of the screw 200 pulled out from the portion wound in a spiral shape can be taken out from the lateral side of the supply passage 96*a*. Further, the coupling band 201 after the screw 200 is injected can be taken out from the lateral side of the opening portion 12*d*. Accordingly, in the case where the screw coupling body 203 in use is to be taken out, the screw coupling body 203 can be taken out from the magazine 90 without separating the coupling band 201 after the screw 200 is injected.

Further, in a case where the screw coupling body 203 in use is to be loaded, the coupling band 201 after the screw 200 is injected can be inserted into the opening portion 12*d* from the lateral side. Accordingly, in the case where the screw coupling body 203 in use is to be loaded, the screw coupling body 203 can be loaded into the magazine 90 without separating the coupling band 201 after the screw 200 is injected.

In the screw driving machine 1A, when the magazine cap portion 97 and the door portion 98 are in the closed state, the openings in the side portion of the magazine 90, the side portion of the supply passage 96*a*, the side portion of the injection passage 12*a*, and the side portion of the discharge port 12*c* are covered with the magazine cap portion 97 and the door portion 98, and the opening portion 12*d* is covered with the magazine cap portion 97 and the door portion 98. In addition, the door portion 98 covers the opening portion 12*d* in the state where the discharge port 12*c* is opened. Accordingly, the supply passage 96*b* can be formed in a form in which the coupling band 201 after the screw 200 is injected can be discharged from the discharge port 12*c* to the outside of the nose portion 12.

As described above, the magazine cap portion 97 and the door portion 98 are integrally coupled by the coupling shaft 98*a*, the magazine cap portion 97 and the door portion 98 are integrally opened, and the opening portion 12*d* is exposed, so that the screw coupling body 203 is easily loaded.

In a case where the screw coupling body 203 is clogged in the supply passage 96*a* due to the operation of feeding the screw coupling body 203 by the screw feeding portion 9, a load is applied to the openable and closable door portion 98.

On the other hand, in the screw driving machine 1A, when the magazine cap portion 97 and the door portion 98 are in the closed state, the side of the door portion 98 that is close to the coupling shaft 98*a* coupled to the magazine cap portion 97 is held in the closed state by the first engaging portion 99*a*. In addition, the side that is close to the nose portion 12 is held in the closed state by the second engaging portion 99*b* by the engagement between the engaging convex portion 99*c* and the engaging concave portion 99*d*.

Accordingly, in the configuration in which the magazine cap portion 97 and the door portion 98 are integrally coupled by the coupling shaft 98*a*, the door portion 98 can ensure the same strength as that of a door portion in a configuration in which a magazine cap portion and a door portion are separately opened and closed.

In the screw driving machine 1A, the magazine cap portion 97 and the door portion 98 are integrally coupled by the coupling shaft 98*a*, so that the magazine cap portion 97 and the door portion 98 change between the linearly extending form and a bent form by the relative rotation thereof with the coupling shaft 98*a* as a fulcrum.

Further, the screw driving machine 1A is configured such that the second engaging portion 99*b* includes the engaging convex portion 99*c* in the door portion 98 and the engaging concave portion 99*d* in the nose portion 12, and the guide portion 99*e* extending from the engaging concave portion 99*d* to the side facing the magazine 90 is provided, allowing the engaging convex portion 99*c* to be inserted into and removed from the engaging concave portion 99*d* using the guide portion 99*e* as a guide.

Accordingly, in the second engaging portion 99*b*, when the magazine cap portion 97 and the door portion 98 are caused to change from the bent form to the linearly extending form, the engaging convex portion 99*c* enters the engaging concave portion 99*d* using the guide portion 99*e* as a guide, the engaging convex portion 99*c* further moves along the engaging concave portion 99*d*, the engaging convex portion 99*c* and the engaging concave portion 99*d* engage with each other, and the magazine cap portion 97 and the door portion 98 are brought into the closed state.

Therefore, as compared to the configuration in which the magazine cap portion provided in the magazine and the door portion provided in the nose portion are independently opened and closed, since the magazine cap portion 97 and the door portion 98 can be integrally opened and closed, the operation of opening and closing the magazine 90 by the magazine cap portion 97 and the door portion 98 is easy. In addition, it is possible to prevent generation of a load due to the engagement between the engaging convex portion 99*c* and the engaging concave portion 99*d* by the operation of bringing the magazine cap portion 97 and the door portion 98 into the closed state.

In the present illustrative embodiment, the screw driving machine operated by the air pressure as a tool is described as an example, but the present invention is also applicable to a screw driving machine driven by electricity, a nail driving machine operated by air pressure using a nail as a fastener, a nail driving machine driven by electricity, and the like.

What is claimed is:

1. A handheld tool comprising:

a nose portion having an injection passage for a fastener;

a magazine configured to accommodate the fastener and located along an intersecting direction intersecting the injection passage;

a magazine cap portion including a tip portion and a base end portion, the base end portion being located opposite to the tip portion in the intersecting direction, the magazine cap portion being configured to open and close the magazine by the tip portion separating from and approaching the magazine, the tip portion being rotatable to separate from and approach the magazine with the base end portion as a fulcrum; and a door portion rotatably coupled to the tip portion of the magazine cap portion via a coupling shaft, wherein the nose portion includes an engaging portion engageable with the door portion, and wherein the door portion is configured to:

in a state in which the magazine cap portion is opened, bend toward the magazine with the coupling shaft as a fulcrum; and in a state in which the magazine cap portion is closed, extend linearly and engage with the engaging portion.

2. The handheld tool according to claim 1, further comprising:

a biasing portion configured to bias the door portion in a bending direction with respect to the magazine cap portion.

3. The handheld tool according to claim 2, wherein the nose portion includes a guide portion configured to cause the door portion that is bent with respect to the magazine cap portion to linearly extend against a biasing force of the biasing portion when the magazine cap portion is closed.

4. The handheld tool according to claim 3, wherein the door portion engages with the engaging portion by being caused to linearly extend by the guide portion.

5. The handheld tool according to claim 1, wherein the tip portion of the magazine cap portion is located on a side closer to the injection passage than the base end portion of the magazine cap portion in the state in which the magazine cap portion is closed.

6. The handheld tool according to claim 1, wherein in a state in which the tip portion is rotated to approach the magazine while the door portion is bent toward the magazine with the coupling shaft as the fulcrum, when the tip portion is pressed in a direction perpendicular to the injection passage and the intersecting direction, the tip portion is configured to move in the intersecting direction.

7. The handheld tool according to claim 3, wherein the guide portion extends in the intersecting direction and is configured to guide the door portion in the intersecting direction.

* * * * *